US005640756A

United States Patent [19]

Brown et al.

[11] Patent Number: 5,640,756

[45] Date of Patent: Jun. 24, 1997

[54] MANUFACTURING SYSTEM

[75] Inventors: Robert L. Brown, Hartville, Ohio; James J. McDonald, Pickney, Mich.; Max J. Miller, Jr., Suffield; David E. Baxter, deceased, late of Ravenna, both of Ohio, by Carol Baxter, Heiress, Gregory L. Baxter, Jeffrey A. Baxter, Mark A. Baxter, Pamela K. (Baxter) Stone, Steven W. Baxter, heirs

[73] Assignee: GenCorp Inc., Fairlawn, Ohio

[21] Appl. No.: 385,501

[22] Filed: Feb. 8, 1995

[51] Int. Cl.$^6$ .................................................... B23P 21/00

[52] U.S. Cl. ................................ 29/701; 29/712; 29/722; 29/783; 29/785; 29/790; 29/792; 29/563; 29/33 J

[58] Field of Search ............................ 29/701, 712, 722, 29/783, 785, 790, 792, 795, 282, 281.4, 281.5, 564.1, 563, 38 E, 888.08, 888.09, 38 B, 35.5, 33 J

[56] References Cited

U.S. PATENT DOCUMENTS

| | | | |
|---|---|---|---|
| 401,950 | 4/1889 | Haussman . | |
| 2,094,524 | 9/1937 | Busch . | |
| 2,865,303 | 12/1958 | Ferrari, Jr. et al. . | |
| 2,898,859 | 8/1959 | Corneil . | |
| 3,187,951 | 6/1965 | Hardman et al. . | |
| 3,232,496 | 2/1966 | Rockwell, Jr. et al. . | |
| 3,279,505 | 10/1966 | Renz . | |
| 3,302,832 | 2/1967 | Hardman et al. . | |
| 3,437,050 | 4/1969 | Hrdina . | |
| 3,679,331 | 7/1972 | Kushner . | |
| 3,935,885 | 2/1976 | Alter . | |
| 3,970,120 | 7/1976 | Whitecar . | |
| 4,067,479 | 1/1978 | Moline . | |
| 4,152,566 | 5/1979 | Mägerle . | |
| 4,273,260 | 6/1981 | Bush . | |
| 4,373,129 | 2/1983 | Sugalski et al. | 29/792 |
| 4,449,289 | 5/1984 | Kindig . | |
| 4,547,136 | 10/1985 | Rothstein . | |
| 4,602,417 | 7/1986 | Mesch . | |
| 4,620,359 | 11/1986 | Charlton et al. | 29/33 J |
| 4,676,410 | 6/1987 | von Flue . | |
| 4,690,306 | 9/1987 | Stäheli . | |
| 4,874,368 | 10/1989 | Miller . | |
| 4,986,443 | 1/1991 | Saur . | |
| 5,031,295 | 7/1991 | Schmitt . | |
| 5,038,463 | 8/1991 | Kamata . | |
| 5,215,215 | 6/1993 | Sauer . | |
| 5,217,146 | 6/1993 | Neff . | |
| 5,249,709 | 10/1993 | Duckworth . | |
| 5,257,917 | 11/1993 | Minarik et al. . | |
| 5,282,396 | 2/1994 | Crandall . | |
| 5,490,322 | 2/1996 | Goodwater et al. | 29/722 |

FOREIGN PATENT DOCUMENTS

| | | | |
|---|---|---|---|
| 3413255 | 10/1985 | Germany | 29/795 |
| 87145081 | 4/1987 | Germany . | |

*Primary Examiner*—David P. Bryant

*Attorney, Agent, or Firm*—Robert F. Rywalski; Jeanne E. Longmuir

[57] ABSTRACT

An automated continuous manufacturing system which includes a rotatable work table having a plurality of work piece supports for maintaining work pieces during operation of said system, and a plurality of work stations for performing cleaning, pretreatment, treatment or assembly tasks on work pieces secured to said work piece supports. Each of the tasks performed at the work table is performed at a respective work station. Certain of the work stations comprise a removable station subassembly for performing a specific task. The removable station subassemblies are removably engagable with the rotatable work table and may be replaced with an alternate removable station subassembly for performing a desired alternate task. One of the work stations is an assembly station engaged with the rotatable work table for receiving work pieces from their individual work piece supports. The assembly station further includes a removing subassembly for removing the work pieces from the work piece supports for further assembly. An orientation subassembly is also provided with the assembly station, and is mounted adjacent the removing subassembly by a quick change release member to enable easy removal and replacement with an alternate orientation subassembly. The orientation subassembly includes a position sensor for detecting the position of an alignment member of a work piece.

19 Claims, 26 Drawing Sheets

MATCH TO FIG. 16B

MANUFACTURING SYSTEM

TECHNICAL FIELD

The present invention relates to a system for manufacturing vehicle link assemblies having a torsion bar with a support ring attached to each end into which vibration isolation bushings are inserted, and more particularly to a system for feeding, processing, aligning and assembling bushings to form a link assembly.

BACKGROUND OF THE INVENTION

In the past, systems for inserting bushings into torsion bars to form link assemblies have required a great deal of human operator involvement and/or large equipment investments. Even with the use of large systems, the manufacture of link assemblies is typically inefficient and potentially hazardous to the operators. Such systems have typically required a material delivery system for supplying bushings or parts, and a handling system for orienting the bushings once delivered. Additionally, a conveyor system is required for moving the parts between locations for preparation, and to the final desired assembly location. Further, the bushings must be individually cleaning and primed, or otherwise treated and prepared prior to assembly into the torsion bars.

Once prepared, the parts must be properly oriented for insertion assembly. The support rings of the bars are then loaded with the parts and clamped in position within a press for the press fit engagement insertion process of the parts into the support rings. Upon completion of the insertion process, the links are removed from their clamped position and transported via a transport conveyor system for further processing.

One of the disadvantages of such prior systems is with the multiple tasks to be performed on each part prior to assembly into the link assembly. Such tasks complicate the manufacturing process, in that each part must be handled and/or treated a number of times before assembly. In particular, the application of adhesive or other coating material to the parts during preparation for assembly is particularly difficult.

Additionally, problems occur with alignment of the bushing parts prior to insertion into the links. Failure to properly align the parts results in their misalignment within the ring, distortion of the ring, and "pop-out" of the bushings from the link assembly. A further disadvantage of prior systems is that the assembly area must be evacuated to minimize the fire and human hazards involved with the use of adhesives or other coatings containing volatile organic compounds.

SUMMARY OF THE INVENTION

The present invention provides a new and improved manufacturing system for assembling bushing parts within support rings of a torsion bar to form a link assembly.

A system according to the present invention includes a base frame having hollow frame members, which support first and second work tables rotated by a drive mechanism under operation of a computer controller, and a ventilation system which interconnects the base frame and work tables. Each work table has a plurality of rotatable work piece supports or spindle subassemblies, each of which supports an individual bushing or work piece. The work table also includes a plurality of work stations. The work piece supports are rotated to each of the work stations during operation of the system to perform a variety of desired tasks, such as cleaning, pretreatment, treatment or assembly, on the work pieces. The controller controls rotation of the position and movement of the work pieces through the system at preprogrammed or desired locations and specified speeds.

The work tables include a work table section and a drive mechanism section. The work table and drive mechanism sections are substantially enclosed by walls and covers, and are interconnected with the base frame members to form the ventilation system. The ventilation system maintains the safety of the operator against moving parts and fumes which may result from application of various materials during system operation. The walls surrounding the work table section are clear to enable viewing of the work pieces, work piece supports and work stations during operation of the system.

The bushing work pieces are provided to the work piece supports either manually, or automatically, such as by pick and place pneumatically controlled robotic arms. The bushing work pieces are typically cylindrical items, having a hollow metal insert surrounded by molded rubber material. The work piece supports or spindle assemblies are configured to engage the hollow metal insert of the bushing work pieces.

After being loaded onto the work piece supports at the first work station, the work pieces are rotated on their respective supports to the various work stations of the work table. The work pieces may be rotated by the operator's manual instruction, or automatically. The work table includes multiple work stations for performing any desired treatment tasks, and preferably six stations. The work piece supports are rotated by a drive mechanism.

At the second work station, the work pieces may be cleaned by a roll assembly which is also operated by the drive mechanism.

At the third work station, the work pieces may be dried or another desired treatment task may be performed.

At the fourth work station, the work pieces may be coated with a coating material which is also operated by the drive mechanism.

At the fifth work station, the work pieces may continue to dry, stand idle, or another desired treatment task may be performed.

At the sixth work station, and preferably an assembly station, the position of each work piece is determined to ensure that it is properly aligned for further processing. In the event the work piece is not aligned, it is rotated to its proper position on its work piece support. The position of the work piece is determined and properly positioned using an orientation subassembly. Following alignment, the bushing work piece is stopped and locked in position for insertion into a support ring of the second work piece or torsion bar.

Upon proper orientation, the bushing work piece is transferred, either manually or automatically, to the press arbor station. Where the transfer is performed automatically, a stripper mechanism of the assembly station removes the bushing work piece from the work piece support to a press assembly. Once transferred to the press assembly, the bushing is inserted into a support ring of the torsion bar. Where a completed bushing work piece is provided, one from each of two adjacent work tables, to each support ring of a torsion bar, the operator may complete the necessary insertions into a torsion bar on a synchronized basis.

Other features and advantages of the present invention will become apparent from the following detailed description of the preferred embodiments made with reference to the accompanying drawings, which form a part of the specification.

BRIEF DESCRIPTION OF THE DRAWINGS

FIG. 15A shows a work piece being loaded onto the work station, FIG. 15B shows rotation to a work station where the work pieces are claimed, FIG. 15C shows rotation to an idle work station, FIG. 15D shows rotation to a coating work station of the type shown in FIGS. 3A and 3B, FIG. 15E shows rotation to an idle work station, and FIG. 15F shows rotation to an assembly station;

DETAILED DESCRIPTION OF THE PREFERRED EMBODIMENT

Figure 1A:
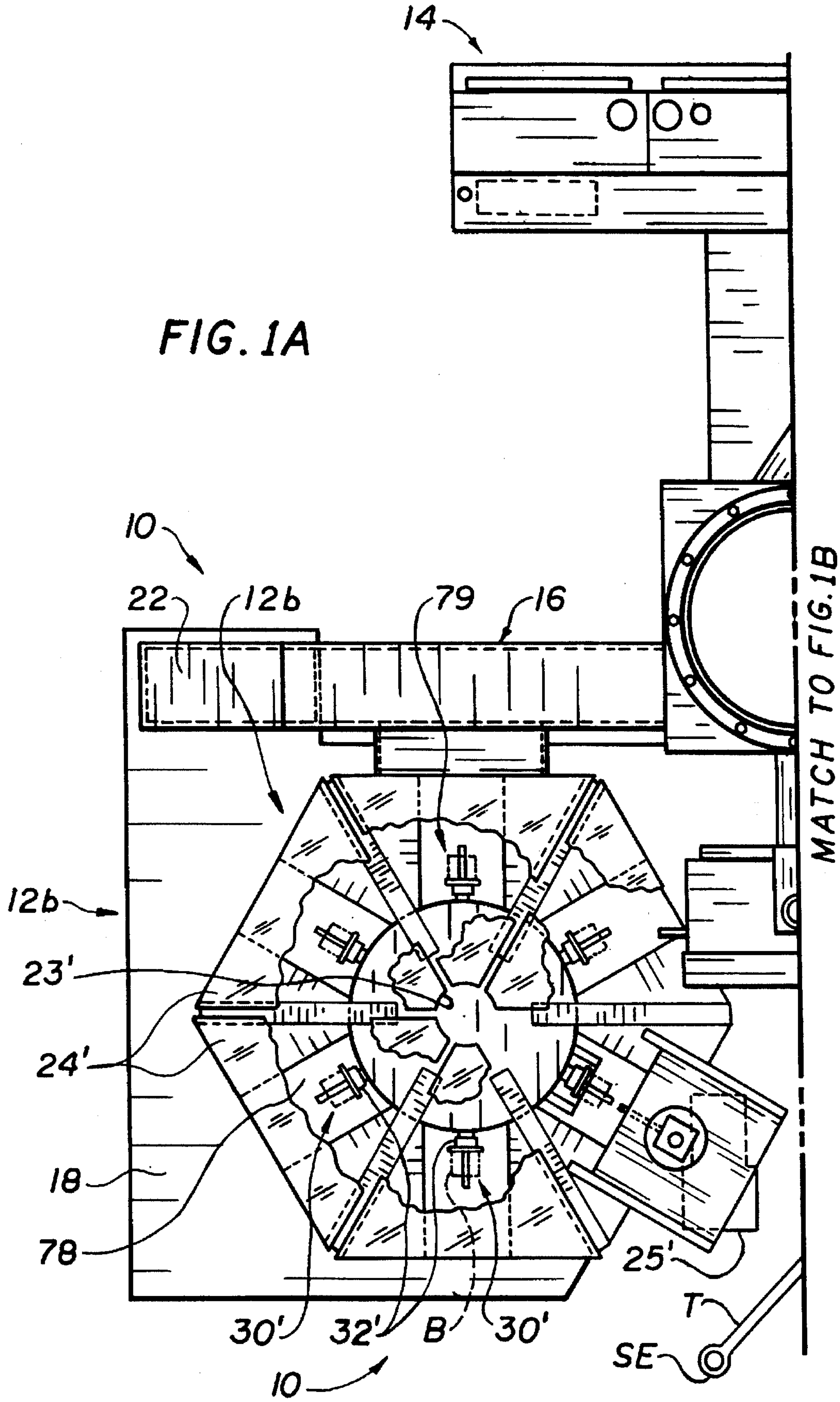
FIGS. 1A and 1B are schematic, partially cut-away, top views of an automated continuous manufacturing system in accordance with the present system.
Figure 1B:
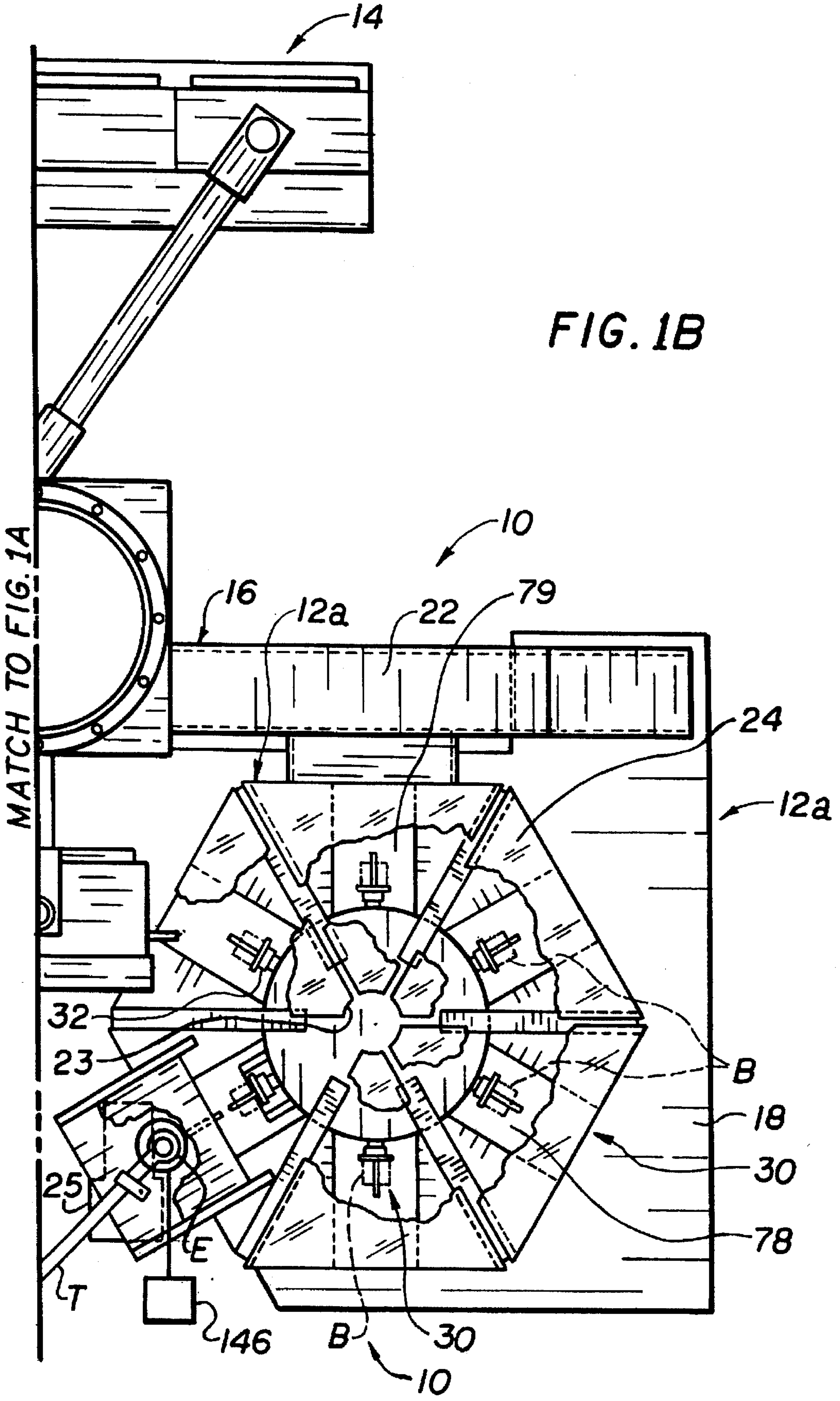

FIGS. 1A and 1B are schematic, partial views of the present automated continuous manufacturing system for feeding, processing, aligning and assembling bushing work pieces to form a link assembly. The link assembly includes a bushing work piece B for engagement with a second work piece or torsion bar T. The torsion bar T includes support rings S on the first and second ends E, SE of the torsion bar. The manufacturing system, generally referred to at reference numeral 10, preferably includes first and second rotatable work tables 12*a*, 12*b*, a controller system 14 for controlling operation of the system, including the position and movement of bushing work pieces through the system 10, and a ventilation system 16 for reducing the risk of harmful vapors by containing and removing such vapors from the work tables 12*a*, 12*b*. The work tables 12*a*, 12*b*, are enclosed by clear cover panels 24 which permit the operator to view the work tables during operation, while at the same time preventing exposure to moving parts or vapors from any materials being applied during operation. The covers 24 are manufactured of a clear synthetic resin material, for example, Tempered Glass. As the work tables 12*a* and 12*b* are substantially similar structures in mirror image configuration, only the differences between the work tables, if any, will be discussed in further detail. The components of the second work table 12*b* will be referenced by a prime designation.

Figure 2A:
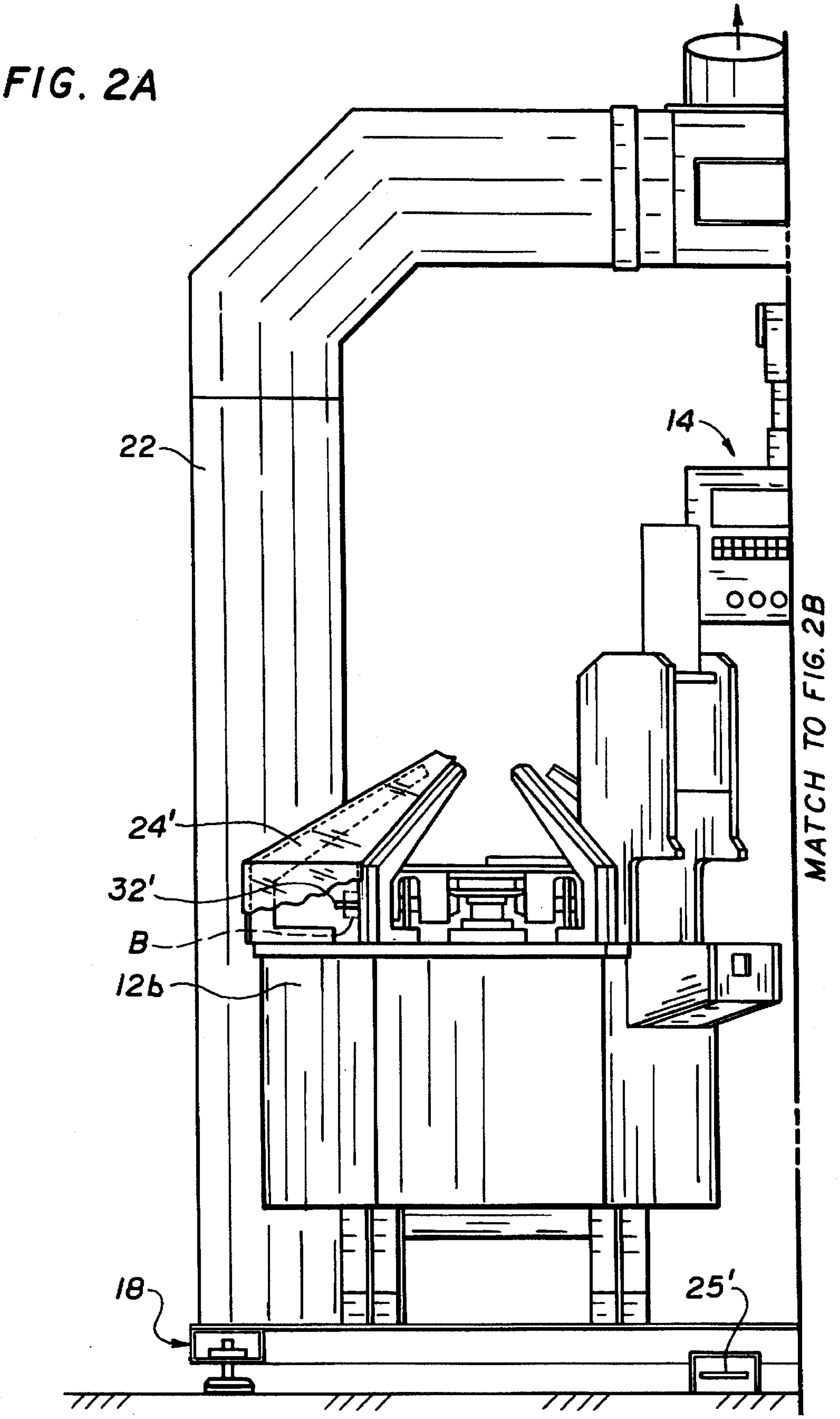
FIGS. 2A and 2B are schematic, partially cut-away front views of the system of FIGS. 1A and 1B, respectively.
Figure 2B:
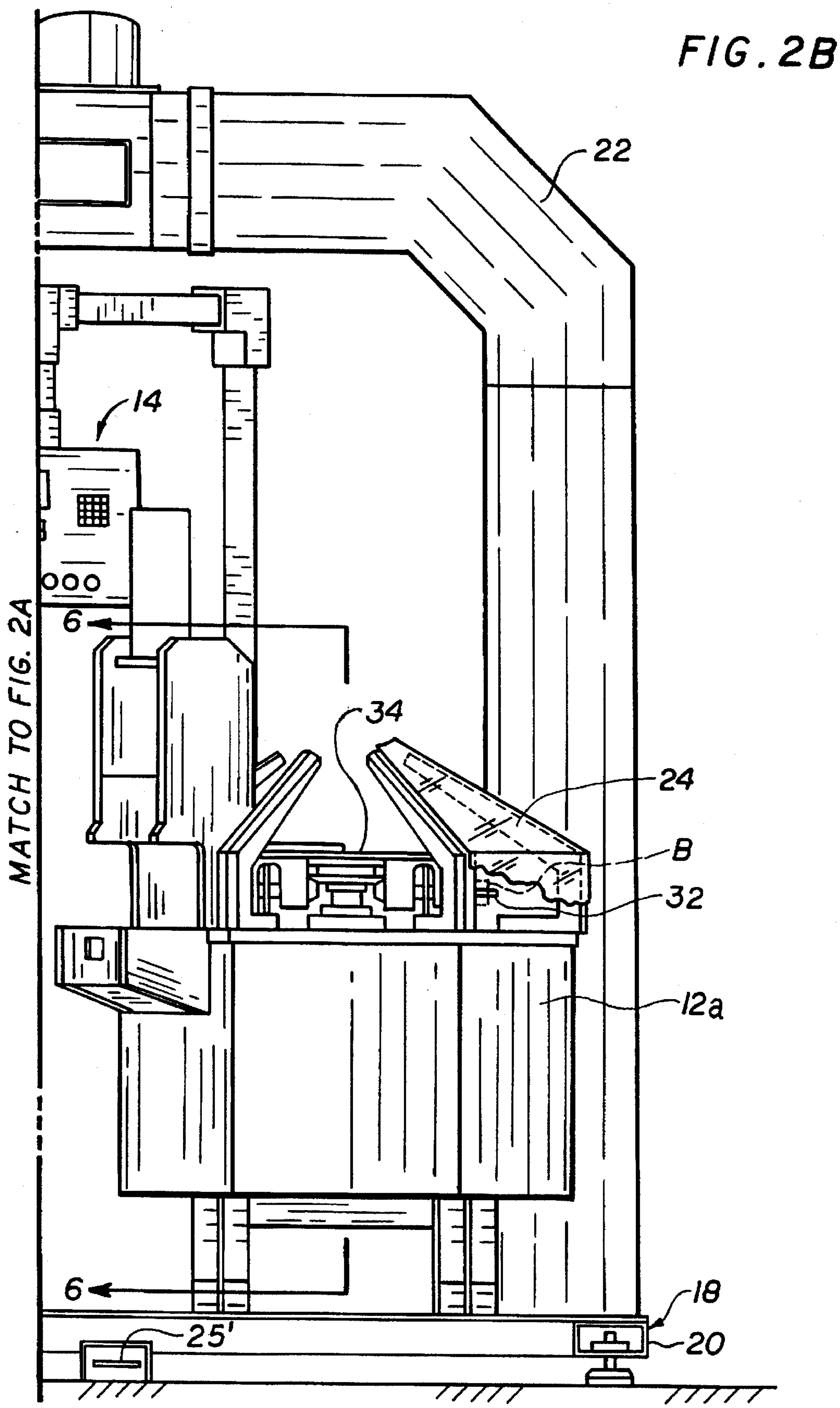
Figure 3A:
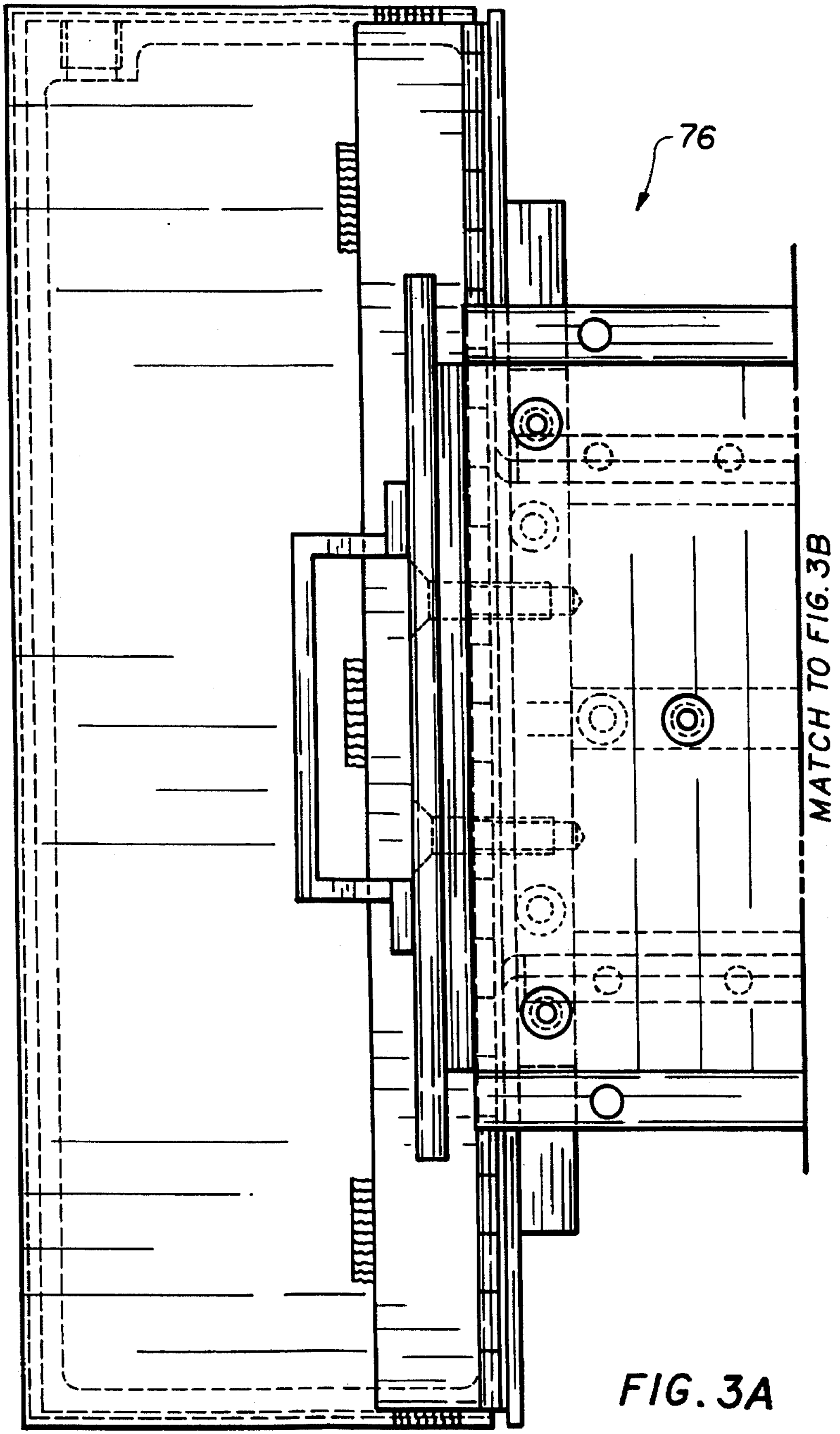
FIGS. 3A and 3B are top views of a removable station subassembly for the application of material to a work piece.
Figure 3B:
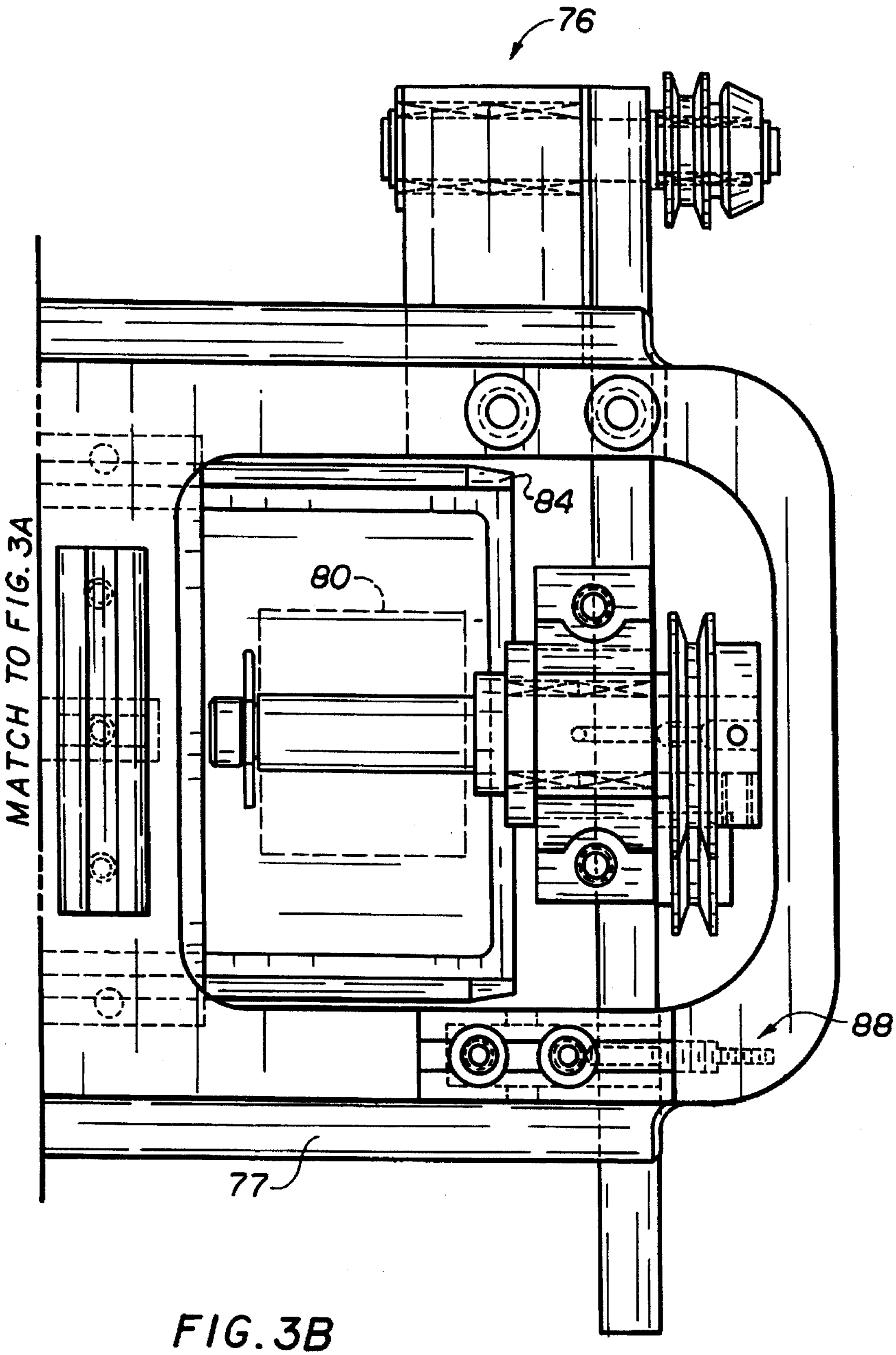
Figure 4A:
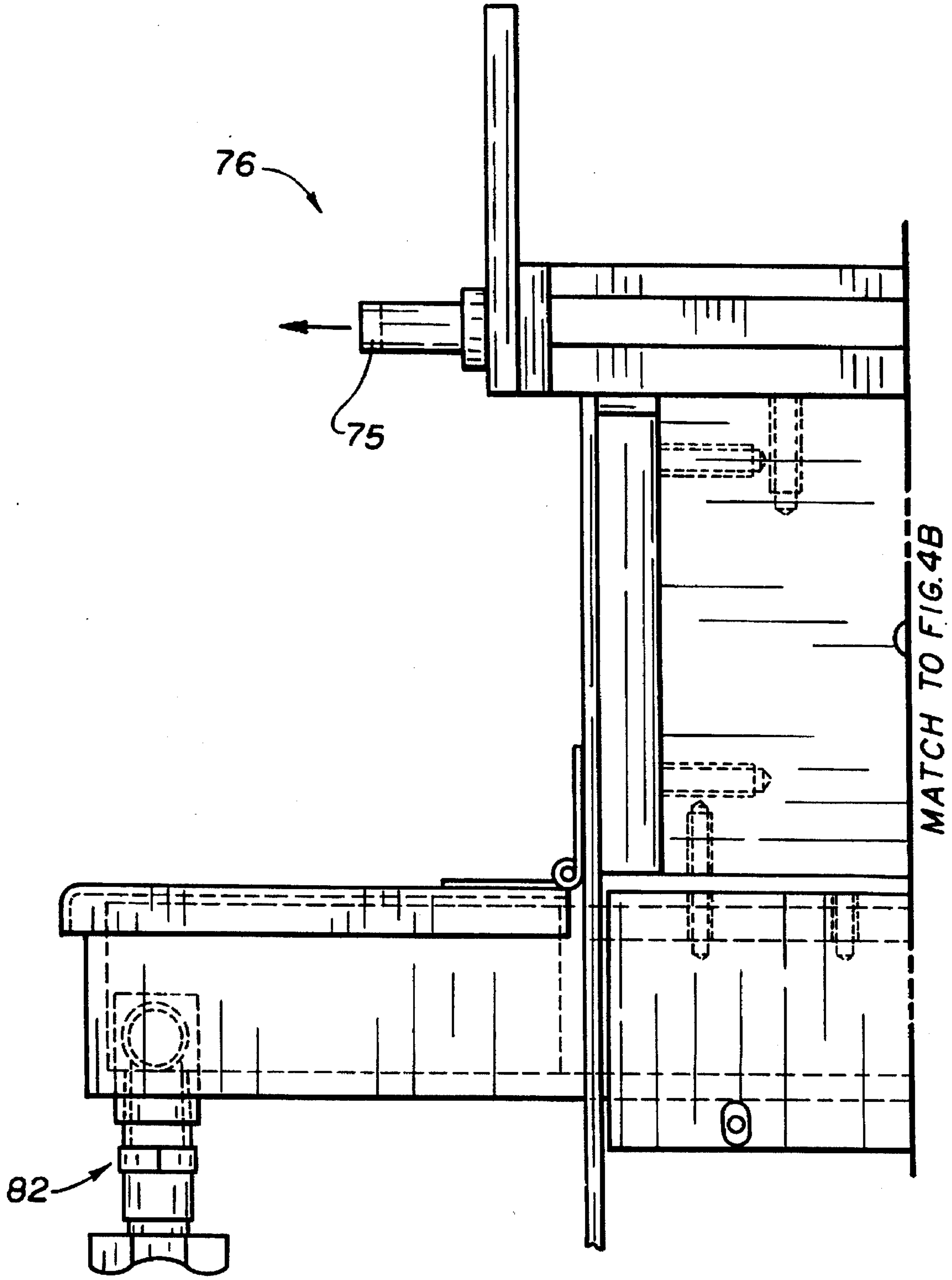
FIGS. 4A and 4B are side views of the sub-assembly of FIGS. 3A and 3B.
Figure 4B:
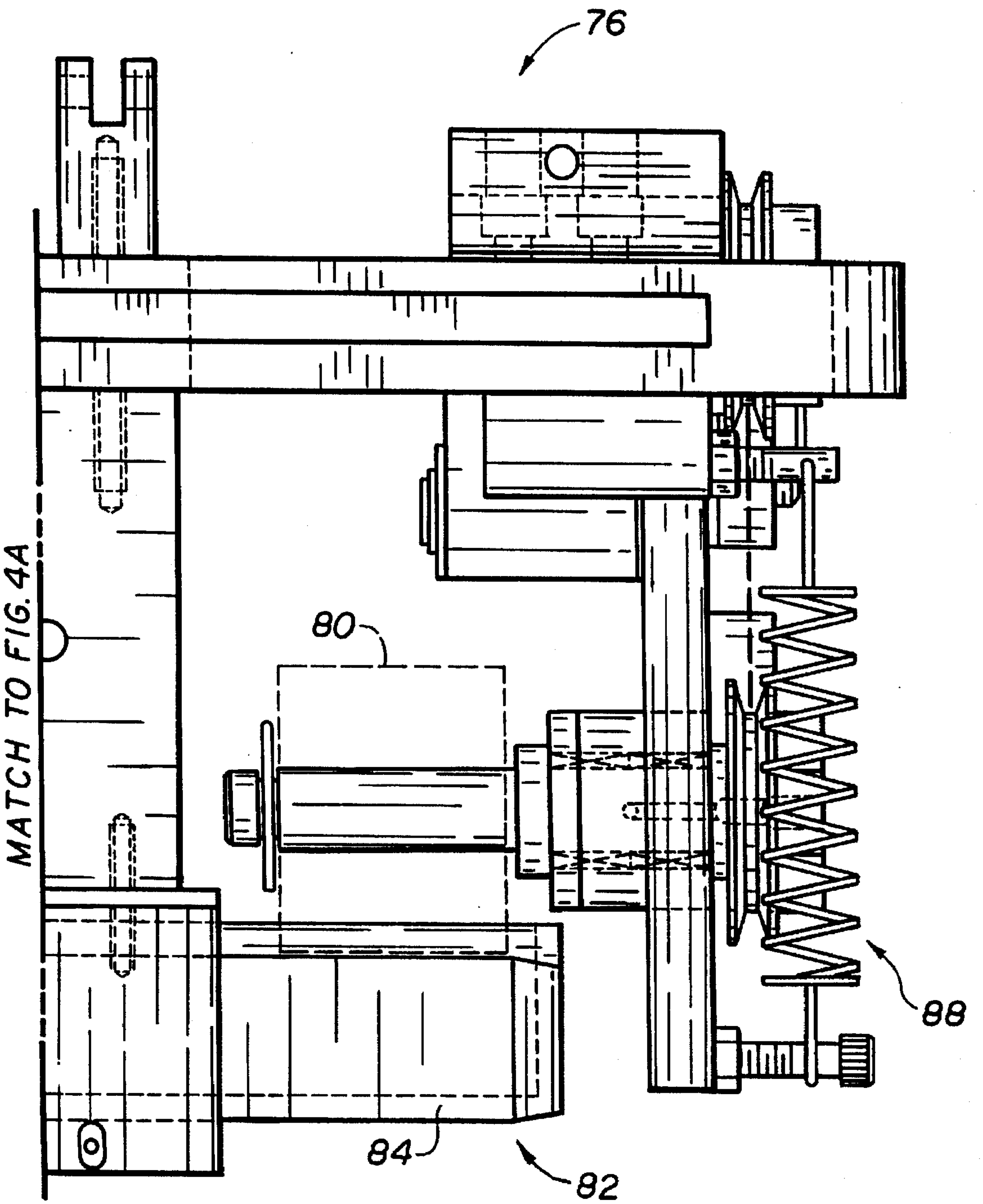
Figure 5:
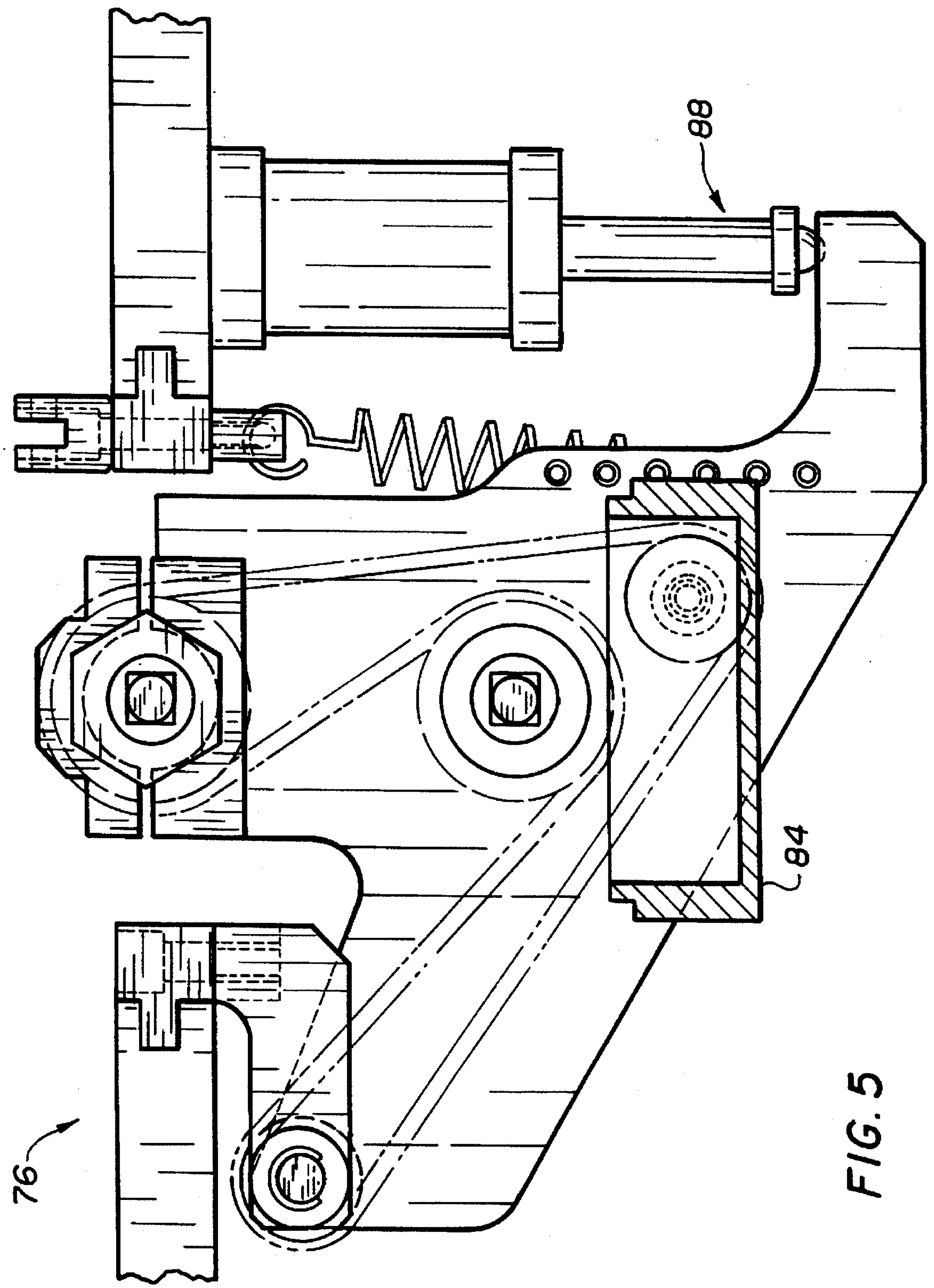
FIG. 5 is a partial end view of the subassembly of FIGS. 3A and 3B taken along the line 5—5.
Figure 6A:
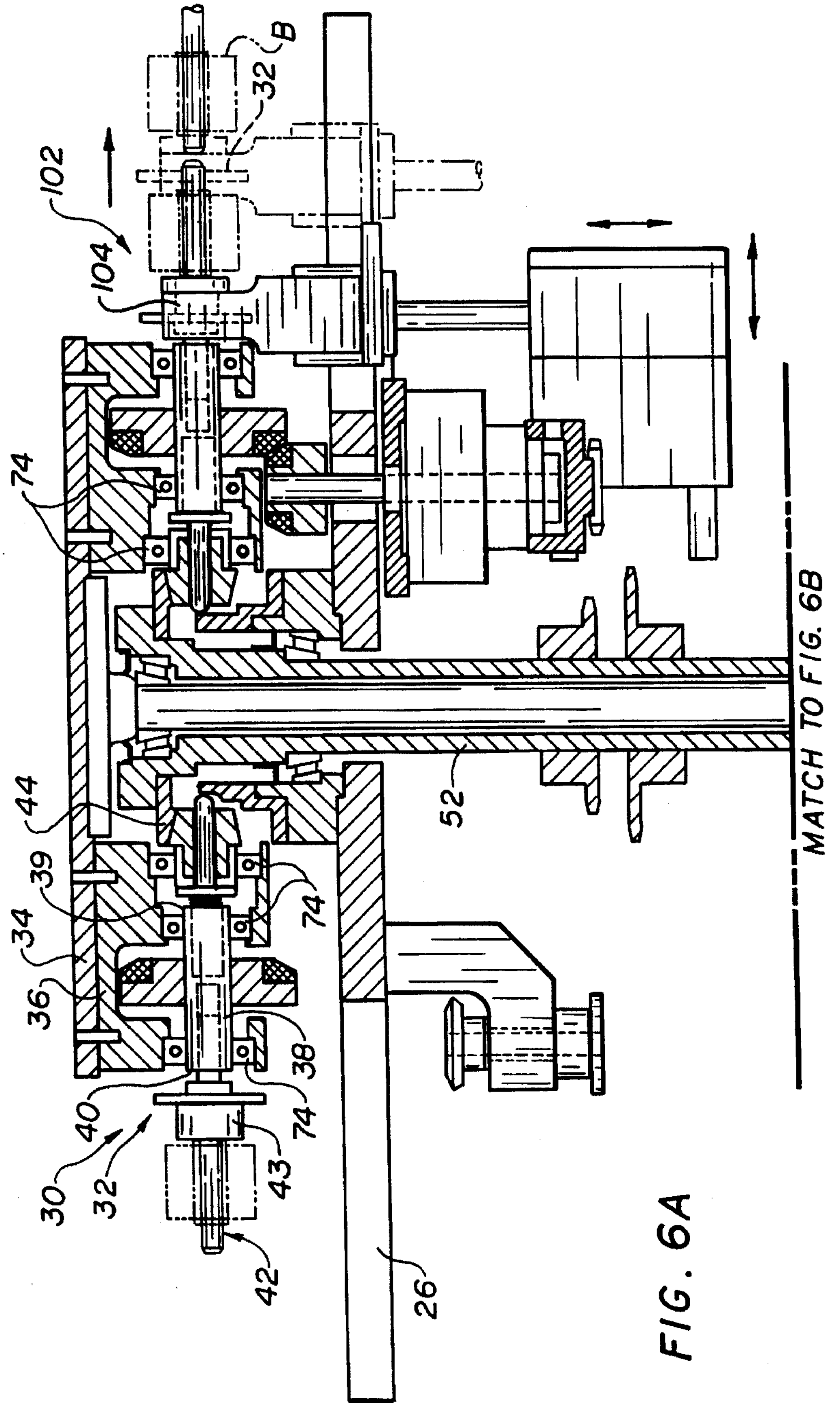
FIGS. 6A and 6B are schematic, partially cut-away, front views of a rotary drive mechanism for the present system taken along the line 6—6 of FIG. 2A.
Figure 6B:
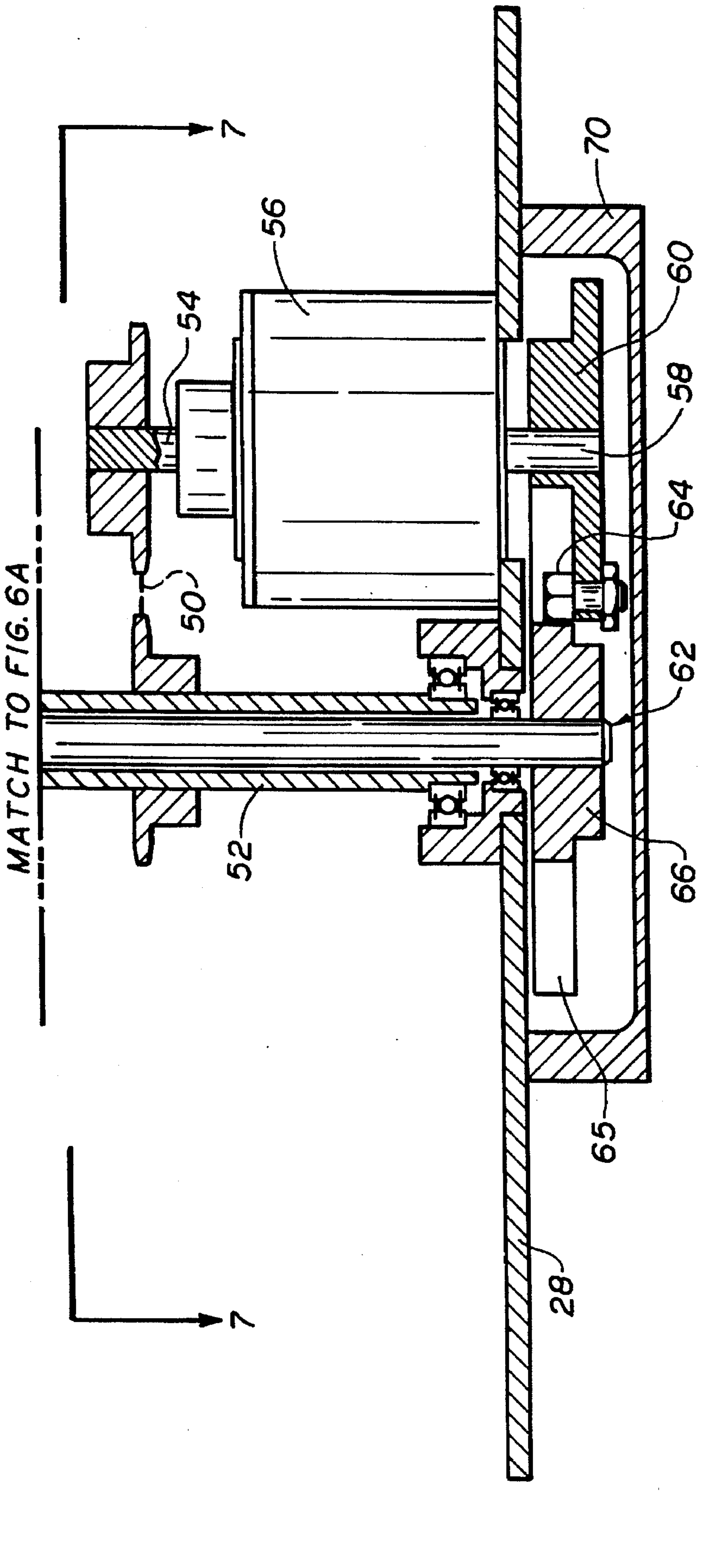

The system 10 is supported on a base frame 18 having hollow frame members 20 as shown in FIGS. 2A and 2B. The frame members 20 are interconnected with the work tables, which are substantially closed to reduce the vapors escaping from the work tables 12 during operation. The frame members 20 are also interconnected with ducts 22 which form a portion of the ventilation system 16 for vapor removal. The ventilation system 16 includes an exhaust fan (not shown) which pulls ambient air into the work tables through openings 23 in the substantially closed work tables 12 and into the frame members and ducts, for removal through an appropriate exhaust vent (not shown). The ventilation system 16 additionally enables control of any environmental exhaust requirements by exhausting the vapors exiting the system 10 at a specified and desired rate.

As illustrated in FIGS. 1B, 2B, 6A and 6B, the work table 12*a*, 12*b* includes an upper support plate 26 and a lower support plate 28. The upper support plate 26 supports a plurality of work stations 30, and a plurality of rotatable work piece supports 32 or spindle subassemblies which support individual bushings or work pieces B. In the illustrated embodiment, the system 10 includes 6 work stations and 6 work piece supports. The work piece supports 32 are rotated to each of the work stations 30 during operation of the system 10 to perform a variety of desired tasks on the work pieces B.

The work piece supports 32 are supported between an index plate 34 and the upper support plate 2*b*. The supports or spindle assemblies 32 are secured to the underside of the index plate 34. Each work piece support 32 includes a spindle block 36 which is secured to the index plate 34. The work piece supports include a central shaft 38, which is mounted via conventional bearing assemblies 74 to the spindle block 36. The central shaft 38 has an inner end 39 and an outer end 40, which is located adjacent the circumference of the work table. Removably inserted into the outer end 40 of the central shaft 38 is a spindle 42. The spindle 42 is preferably a quick change part, meaning a part where each particular spindle is designed to support a particular bushing work piece B, and the spindle may be readily changed in the event the work table is to receive work pieces of a different configuration. Additional parts, as discussed below, may also be readily changed to accommodate a variety of different work pieces.

Work is performed sequentially on each bushing. The spindles 42 are moved between work stations 30 by the manual initiation of the operator, using the foot pedal 25. Included on the spindle 42 is a magnetic slide member 43 used to maintain bushing work pieces on the spindle. The central shaft 38 and engaged spindle 42 are rotated upon engagement of a pinion gear 44 attached on the inner end 39 of the central shaft 38. This construction enables continuous rotation of each of the bushings or work pieces B while supported on the spindle 42. Such rotation is desirable in order to maintain any material applied to the surface of the work piece at the work station. Often, stopping the individual rotation of the work pieces results in material dripping from the bushing onto the work table, or in uneven coating of material on the surface of the work pieces. These disadvantages are avoided by such rotation.

Figure 7:
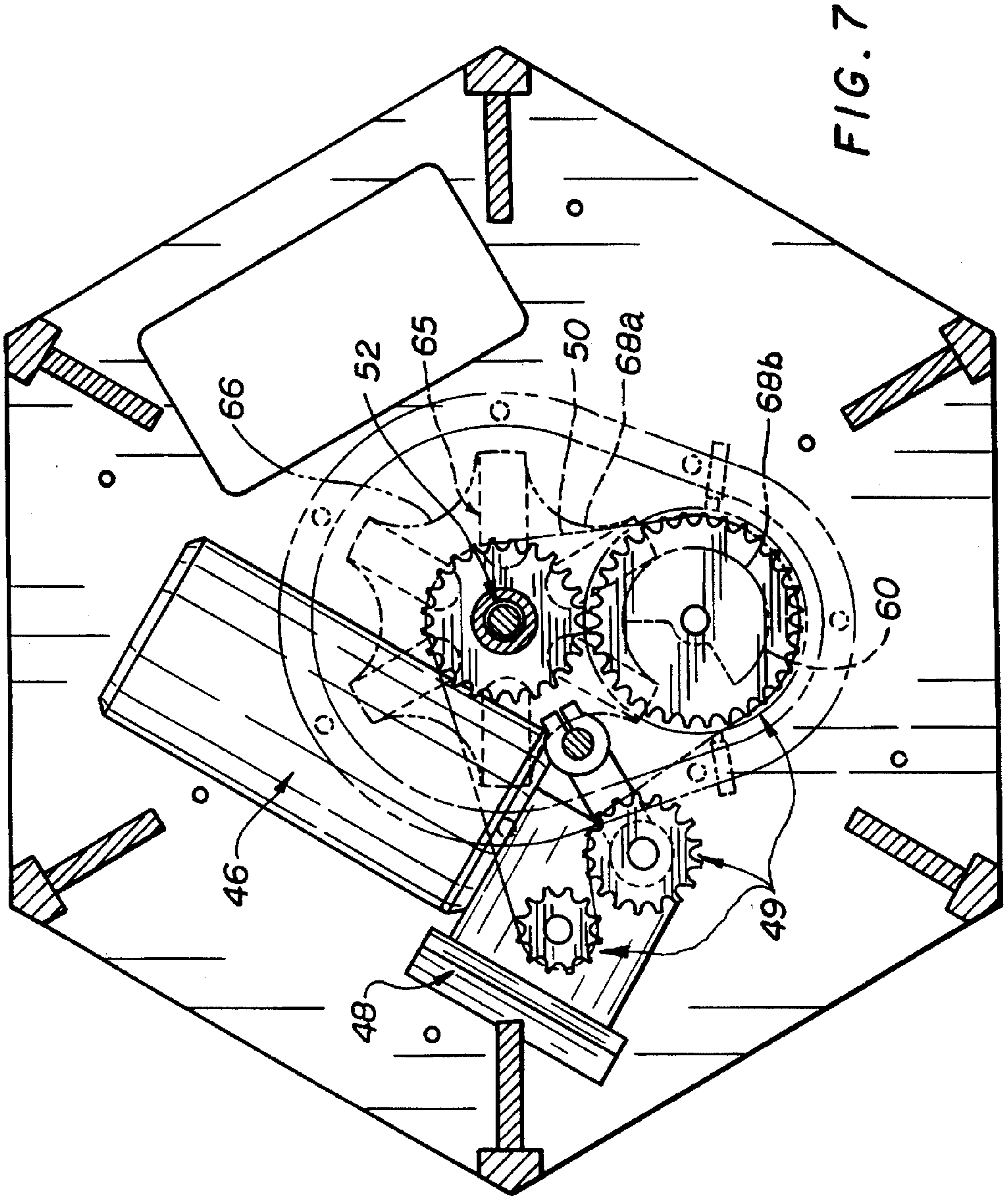
FIG. 7 is a top view of the rotary drive mechanism of FIG. 6B taken along the line 7—7 of FIG. 6B.
Figure 8:
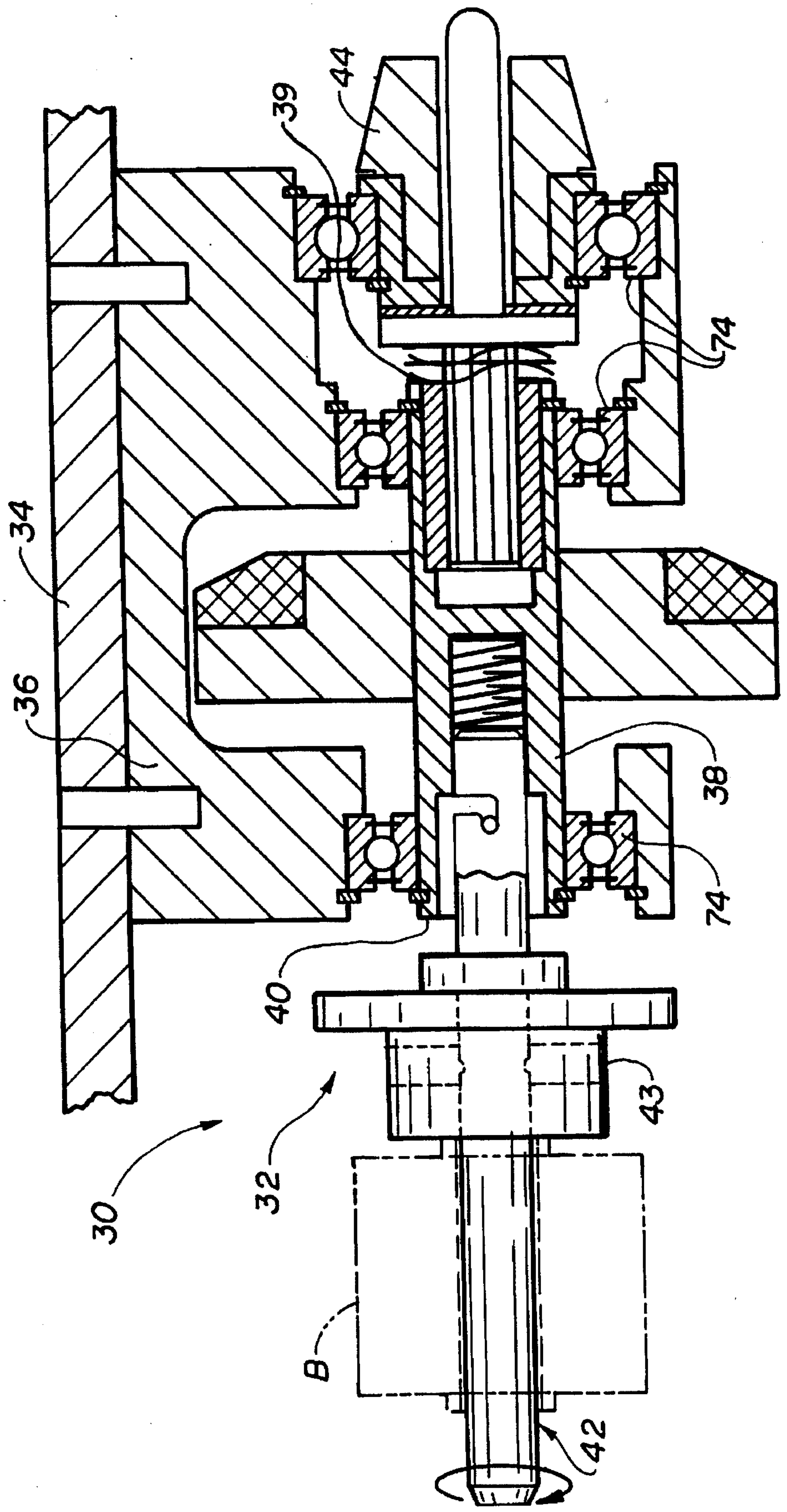
FIG. 8 is a schematic, enlarged, cut-away, side view of a clutch mechanism of the rotary drive mechanism shown in FIG. 6A.

The pinion gear 44 is driven by a rotary drive mechanism or drive train 45 which enables rotary operation of the system 10. As shown in FIG. 7, the drive train 45 is composed of a conventional AC fixed speed motor 46, which in the illustrated embodiment is a ⅓ HP explosion proof gear motor, coupled to a right angle gear reducer 48. The gear reducer 48 drives, via a series of sprocket gears and a roller chain 50, a continuous motion shaft 52 which runs from the lower support plate 28 through the upper support plate 26.

The roller chain 50 and sprocket gears 49 also drive an input shaft 54 engaged with an index clutch 56. Upon pneumatic engagement by rotation of the input shaft 54, torque is transmitted to the output shaft 58 also engaged with the index clutch. This output shaft protrudes downward through the bottom plate 28. On this output shaft 58 the driver wheel 60 of a six station Geneva mechanism 62 is secured. The Geneva mechanism 62 is a conventional device, illustrated in FIGS. 6B and 7, used to convert continuous rotary motion into intermittent rotary motion. Intermittent rotary motion is obtained upon rotation of a cam follower 64 on the driver wheel 60 through radial cut-outs 65 in a star wheel 66. After rotation of the star wheel 60 degrees, the cam follower 64 exists the cut-out 65 of the star wheel 66. The star wheel 66 is then in a dwell position and locked in place by engaged semi-circular surfaces *68a*, *68b* on both the star and driver wheels, respectively. The mechanism is encased within a housing 70 and operates in an oil bath for wear reduction. The star wheel 66 is secured to an index shaft 72 on a lower end 73. The index shaft 72 rotates intermittently inside the continuous shaft 52.

At stations 2–5, the pinion gear is rotated by the ring gear secured to the upper end of the continuous shaft. At station 6, the pinion gear is disengaged from the hollow shaft by the release cam. The hollow shaft can now be driven by the position drive discussed later. The pinion gear remains disengaged at station five.

The circular index plate 34 is attached to the top end of the index shaft.

FIGS. 15A–15F demonstrate movement of the bushing to the various work stations. At station 1, FIG. 15A, bushings are loaded onto a non-rotating spindle, either manually by the operator, or automatically by a loading apparatus.

Figure 15A:
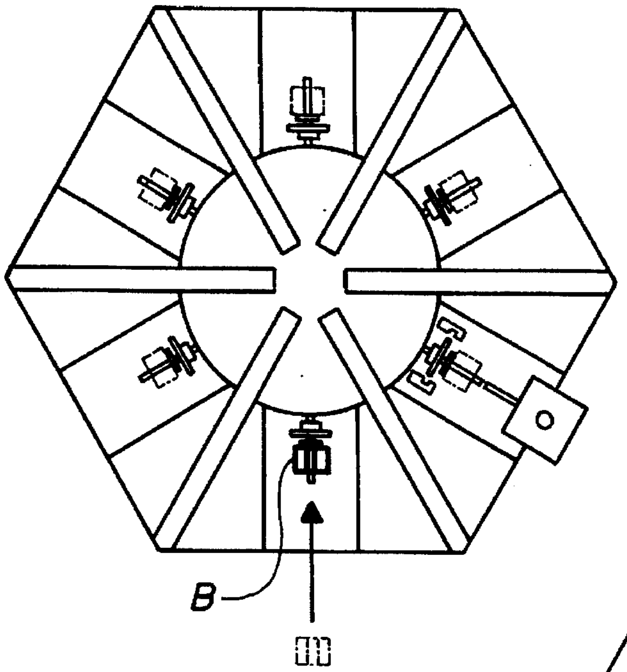
FIGS. 15A–15F are schematic representations showing movement of the work pieces around the work table to the various work stations, where
Figure 15B:
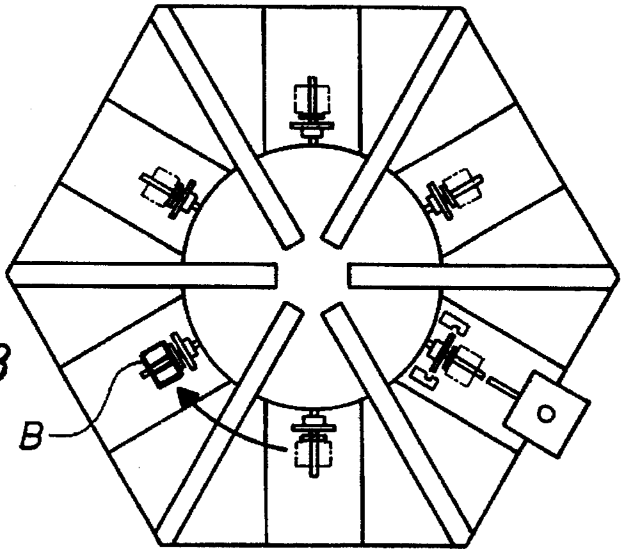

At station 2, FIG. 15B, bushings are cleaned by the cleaning assembly 78, which is one of the removable station subassemblies 76, of the type illustrated in FIGS. 3A, 3B, 4A, 4B and 5. The cleaning assembly 78 is substantially similar to one embodiment of the coating station and assembly 79, described below in connection with the illustrated embodiment of FIGS. 3A, 3B, 4A, 4B and 5, and is not structurally discussed in further detail. However, differences in functional considerations are set forth. The assemblies 78, 79 consist of an air driven doctor roll 80 that rotates through a reservoir system which includes a solvent reservoir. Solvent is transferred to the roll 80 via an adjustable gap which controls the amount of coating material transferred, thus controlling the application thickness and minimizing runoff. The application roll speed and time of contact are variable and programmable.

The illustrated reservoir system 82 includes a coating material tank or pan 84 supported with the removable station subassembly 76, on a station plate 77. The tank 84 is engaged with the station plate using an adjustment mechanism, generally referred to at reference numeral 88. Adjustment of the illustrated embodiment of the application system ensures that the work pieces B are provided with the desired amount of cleaning solvent or other coating material by positioning the tank to engage the rolls with the desired level of material. The adjustment mechanism 88 enables vertical position adjustment of the application system. The tank is raised or lowered by manually actuating a spring operated calibrator using a pointer and scale. The scale is secured to correspond to the position of the tank and the pointer.

Figure 15C:
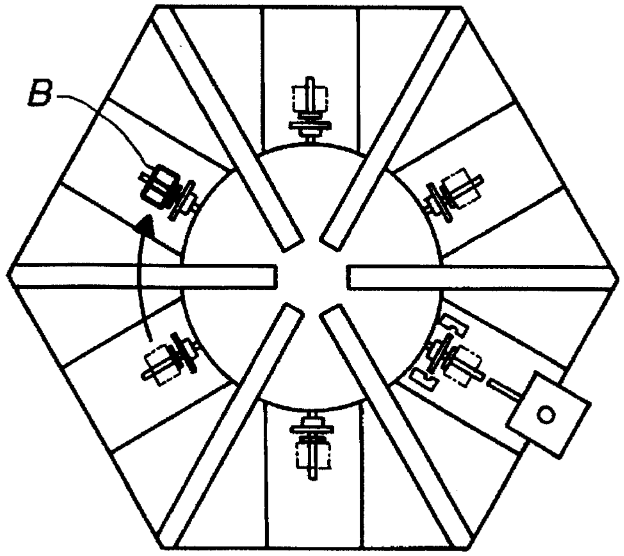

At station 3, FIG. 15C, the operation is idle. However, additional bushing functions may be added to accommodate any desired steps.

Figure 15D:
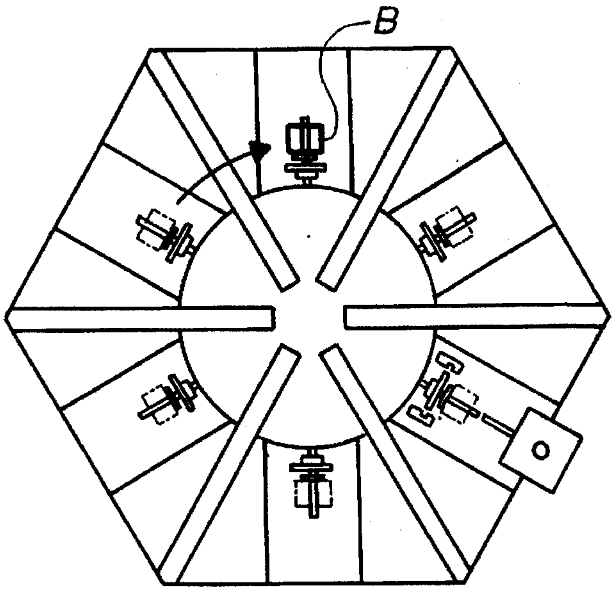

At station 4, FIG. 15D, an adhesive or other coating material is applied. The coating assembly 79 at station 4 (which is a removable work station subassembly 76) may be identical to the cleaning assembly of station 2, but coating the work piece with adhesive or other material instead of solvent. However, it should be understood that a dual component application system, or other system for applying a coating material could likewise be used. In the illustrated embodiment of FIGS. 17–20, a dual component material application system is used to coat the work pieces. The advantage of this system is that there is less coating material waste as well as improved control over the quality of the coating material, due to the fact that there is a reduction in the amount of time the coating material is exposed to the atmosphere. Reduced waste is also obtained, since the system is better able to accurately dispense the coating material precisely where it is desired. By more accurately applying the coating material, cost savings are obtained due to reduced clean-up requirements. Additionally, the reduction in atmospheric exposure also assists with reducing the amount of vapors which are dispensed into the atmosphere. A reduction in vapors in the atmosphere further assists with improving safety concerns due to possible explosions from volatile materials.

Figure 17:
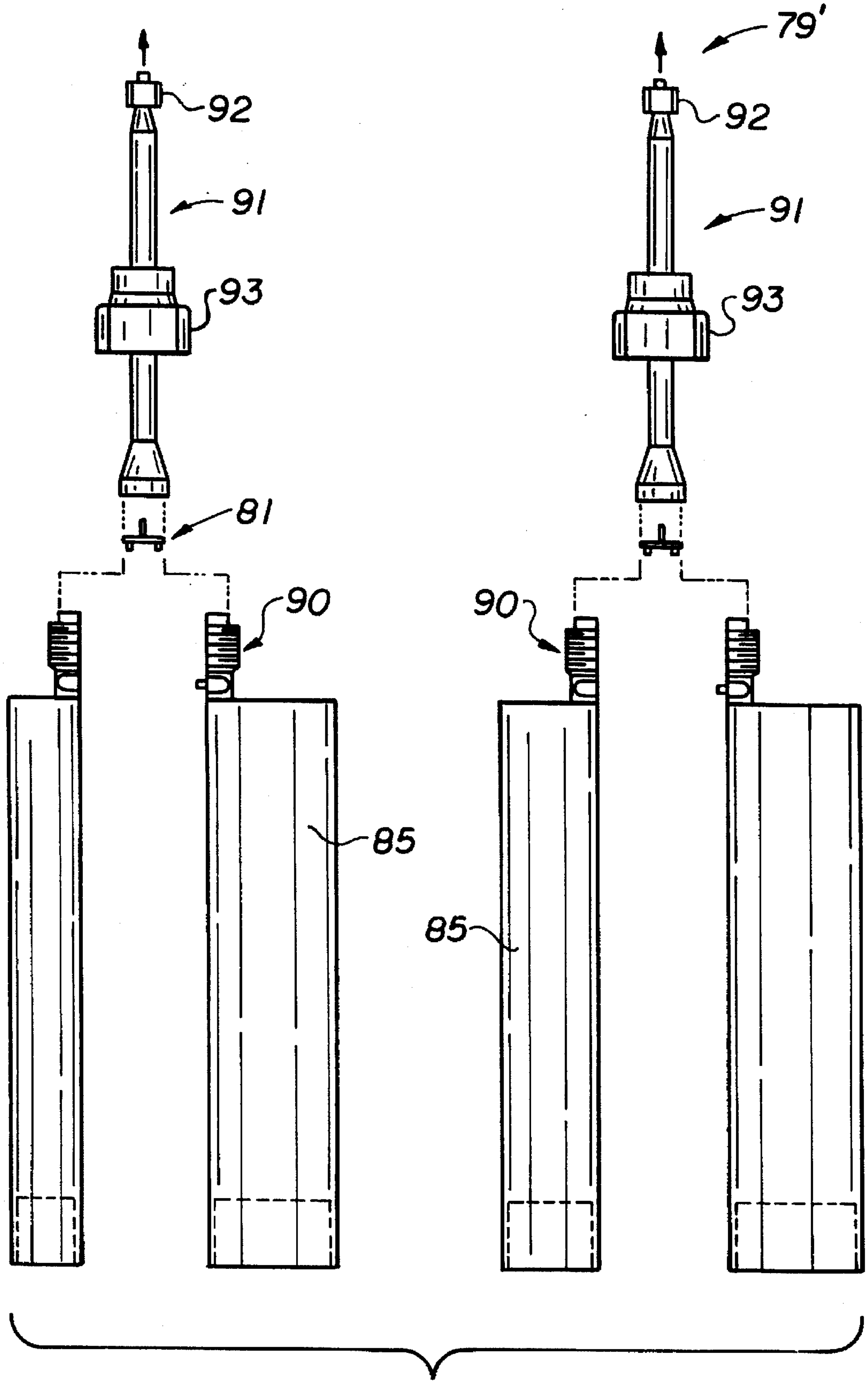
FIG. 17 is an exploded front view of the disposable cartridges of the reservoir dispensing assembly.
Figure 18:
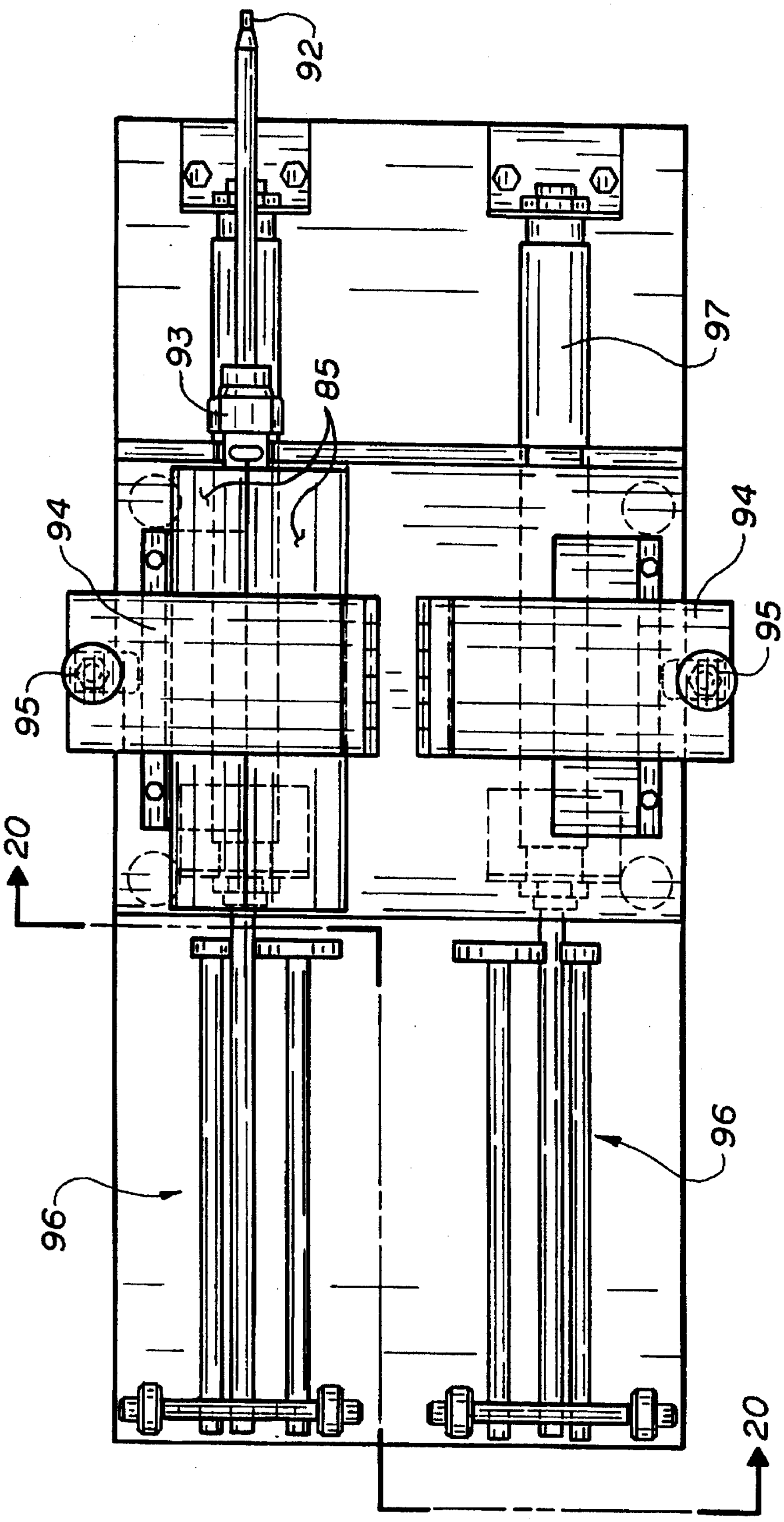
FIG. 18 is a front view of the multiple component coating material reservoir dispensing assembly.
Figure 19:
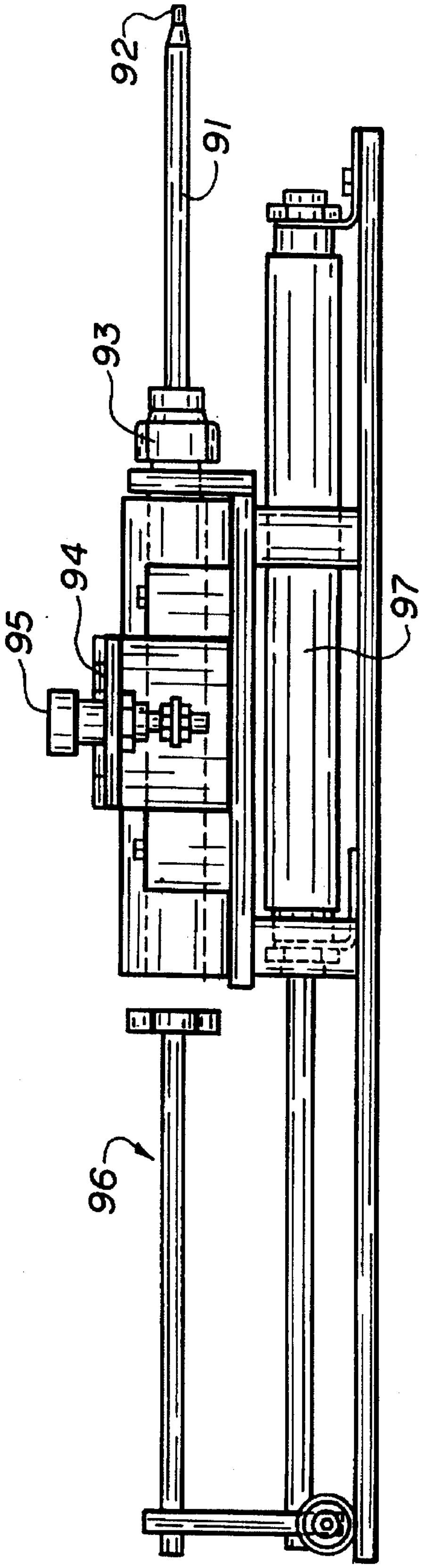
FIG. 19 is side view of the dispensing assembly of FIG. 18.
Figure 20:
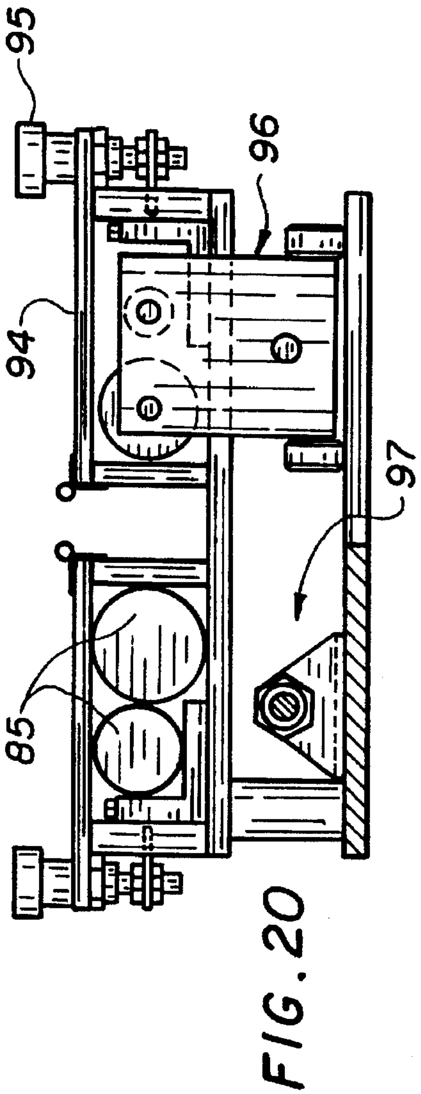
FIG. 20 is a partially cut-away end view of the dispensing assembly of FIG. 18 taken along the line 20—20.

The illustrated system of FIGS. 17–20 provides multiple component adhesive coating material to the rolls 80 for application to the work pieces. The system includes conventional disposable cartridges 85, shown in FIG. 17, containing various material components. The cartridges 85 are interconnected to enable the combination of their respective components. Backflow preventers 81 are included at the cartridge outlets 90 to assist with reducing the gravity feedback of different density components. Conventional static mixers 91 are also provided such that once the material components are dispensed, they are further mixed prior to exiting the system at the outlet 92 for supply or application to either the bushing or rolls. The cartridges 85 are secured together by retaining nuts 93, and secured within the assembly by a pivoting arm 94 secured by a conventional fastener 95. The adhesive components exit the cartridges 85 under pressure of a piston assembly 96. The piston assembly 96 is driven by a conventional pneumatic cylinder 97 operated by the controller 14. Using the controller system, the piston assembly can be used to mix the desired amounts of the adhesive components. As shown in FIGS. 17 and 18, respectively, either a double or single dual cartridge assembly may be used, as needed.

Fluid lines (not illustrated) may be used to extend from the static mixers for supply of the dispensed and mixed coating material to a further pinch valve for supply or application to either the bushing or rolls. The conventional pinch valve restricts the flow of fluid until opening of the valve via spring action. Upon being supplied with a signal from the controller, the pinch valve is opened and coating material is provided to the roll or work piece.

An additional function of this station incorporates adhesive application to the outer edge of the flange that enters the link first at insertion. This adhesive actually coats the internal diameter of the link coupling thus eliminating the need for preswabbing the link with adhesive.

Figure 15E:
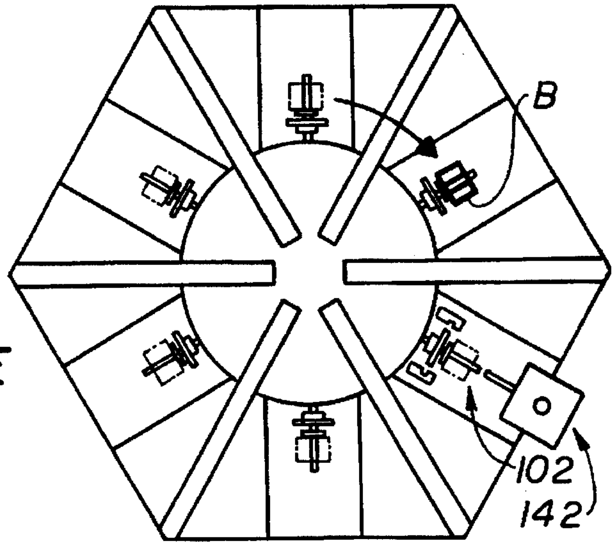

At illustrated station 5, FIG. 15E, the operation is idle, but may be adapted to provide an additional removable station subassembly for performing additional functions.

Figure 15F:
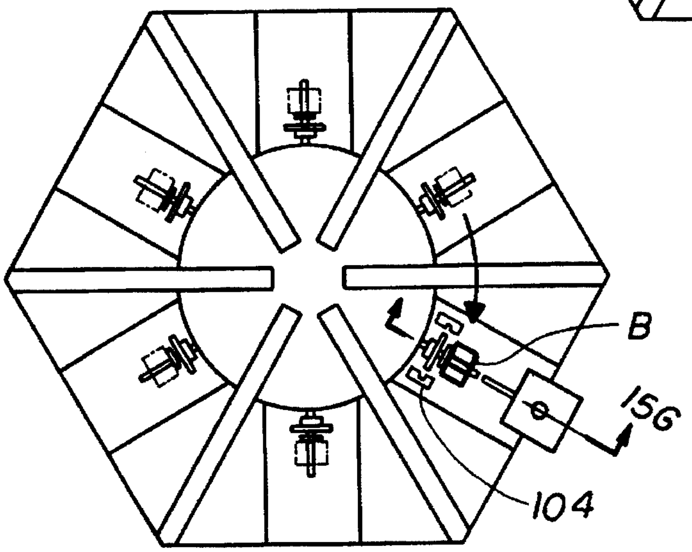
Figure 15H:
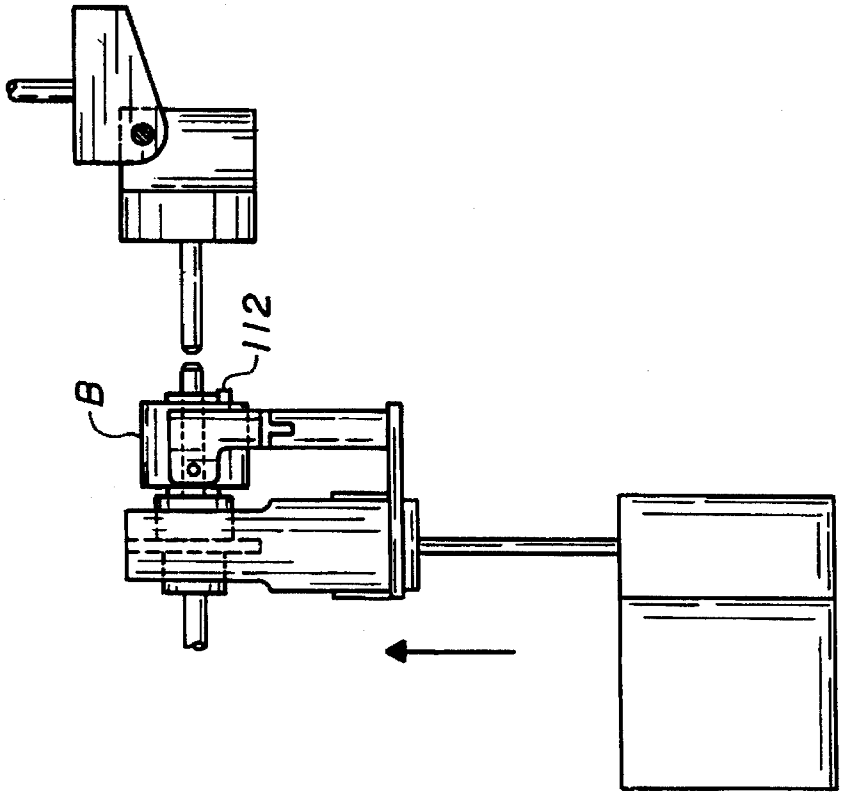
FIG. 15H is a schematic, cut-away, side view of the system of FIG. 15G, with the orientation subassembly engaged surrounding the work piece.
Figure 15G:
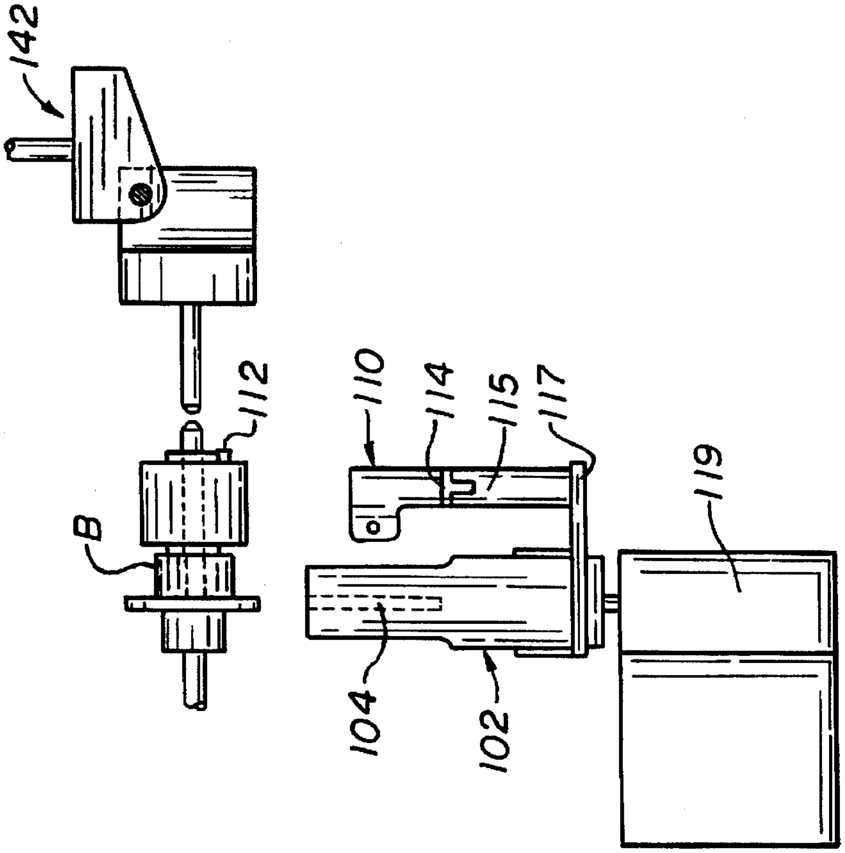
FIG. 15G is a schematic, cut-away, side view of an orientation subassembly, removing subassembly and a work piece supported on a work piece support prior to transfer of the work piece to a press assembly, taken along the line 15G—15G of FIG. 15F.
Figure 15J:
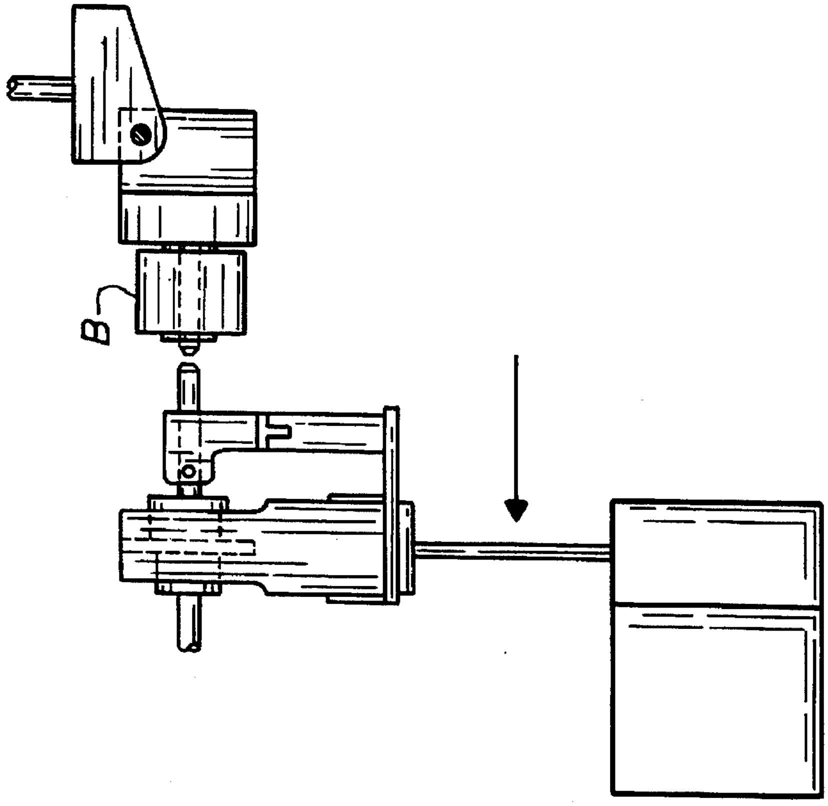
FIG. 15J is a schematic, cut-away, side view of the system of FIG. 15I, where the work piece is on the press assembly and the orientation and removing subassemblies are returned for the next work piece engagement.
Figure 15I:
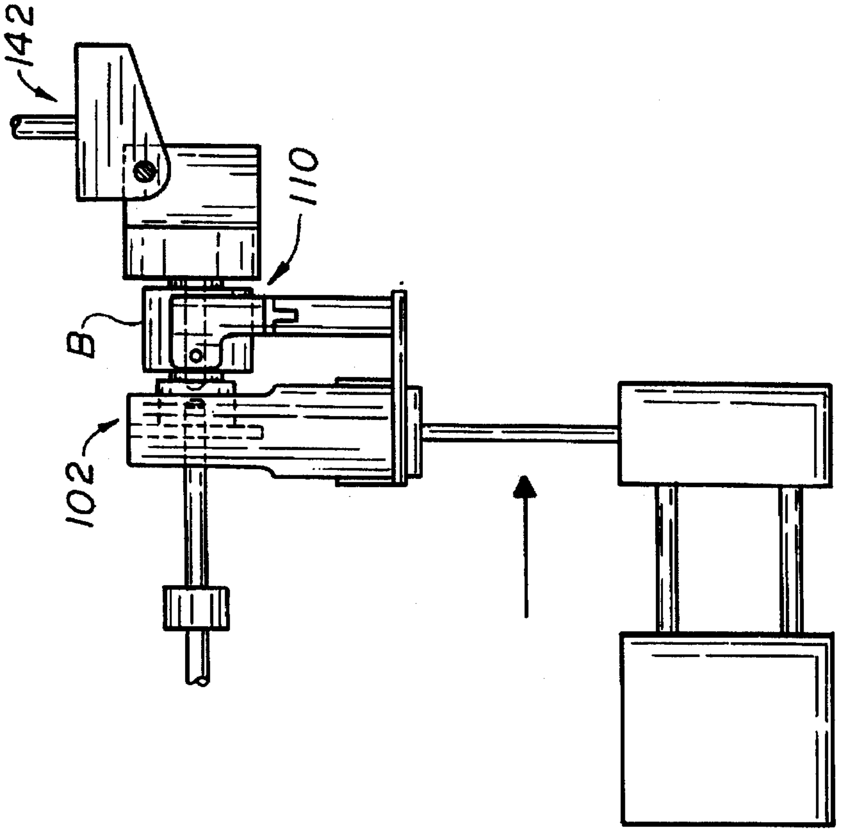
FIG. 15I is a schematic, cut-away, side view of the system of FIG. 15H where the removing subassembly has transferred the work piece to the press assembly.
Figure 15L:
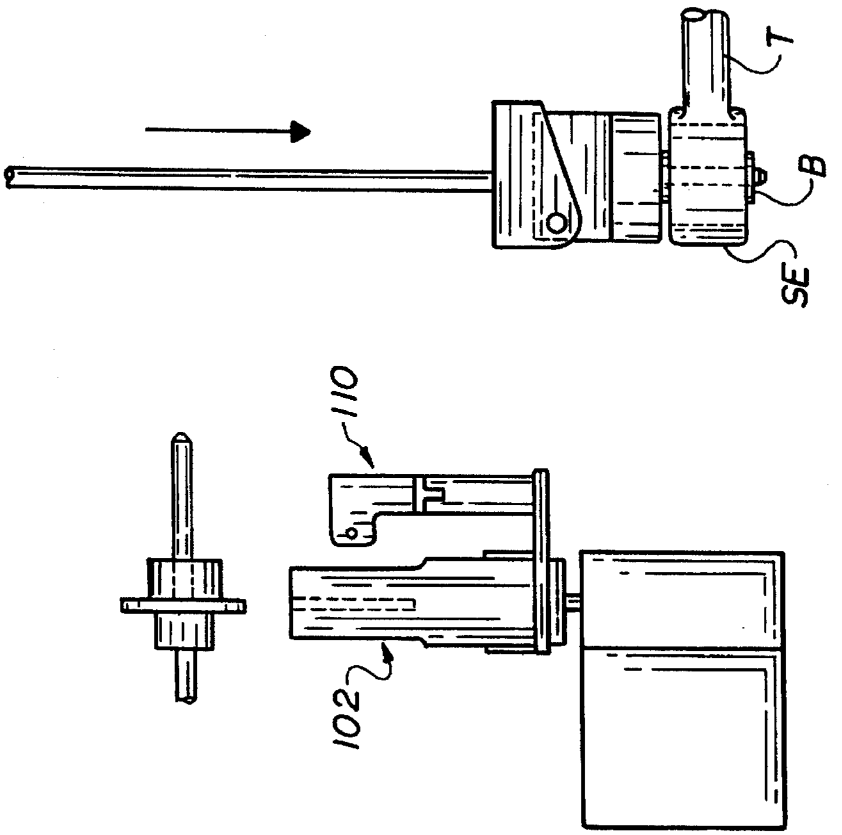
FIG. 15L is a schematic, cut-away, side view of the system of FIG. 15K showing the press assembly press fitting the bushing into engagement within an end of the torsion bar.
Figure 15K:
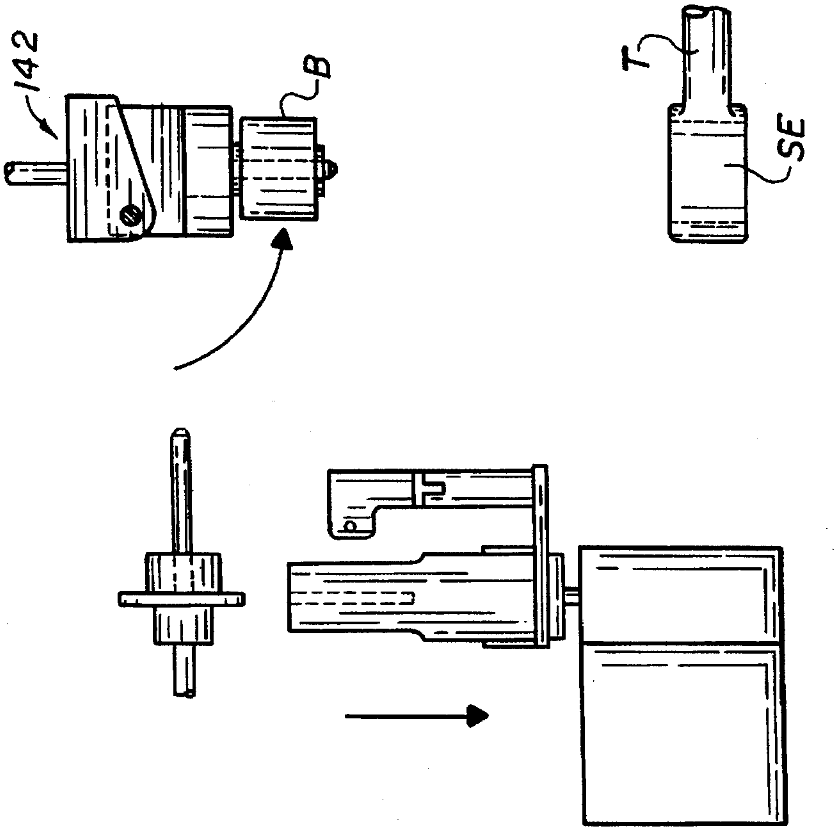
FIG. 15K is a schematic, cut-away side view of the system of FIG. 15J, where the press assembly is pivoted for press fit engagement of the bushing work piece with the torsion bar second work piece.
Figure 15M:
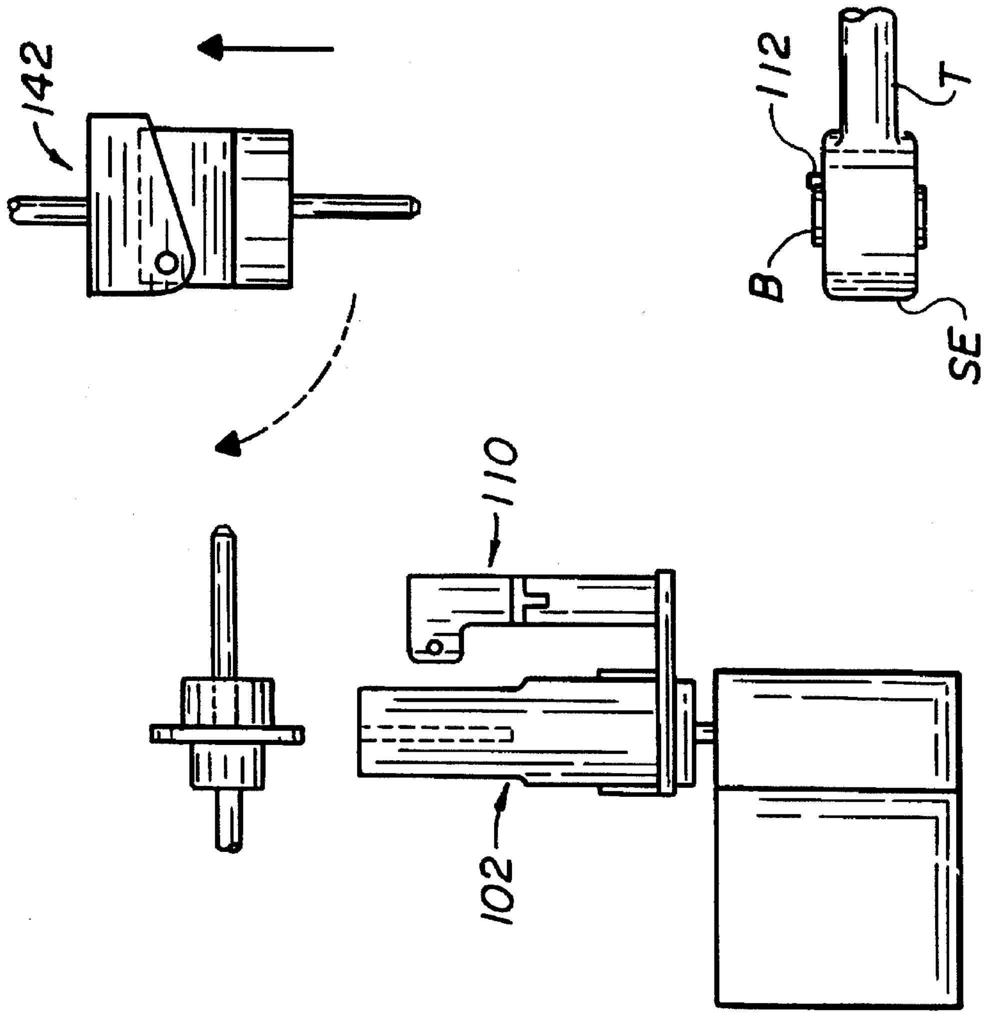
FIG. 15M is a schematic, cut-away, side view of the system of FIG. 15L showing the press assembly retracted for the next work piece engagement, and the completed assembly.
Figure 16A:
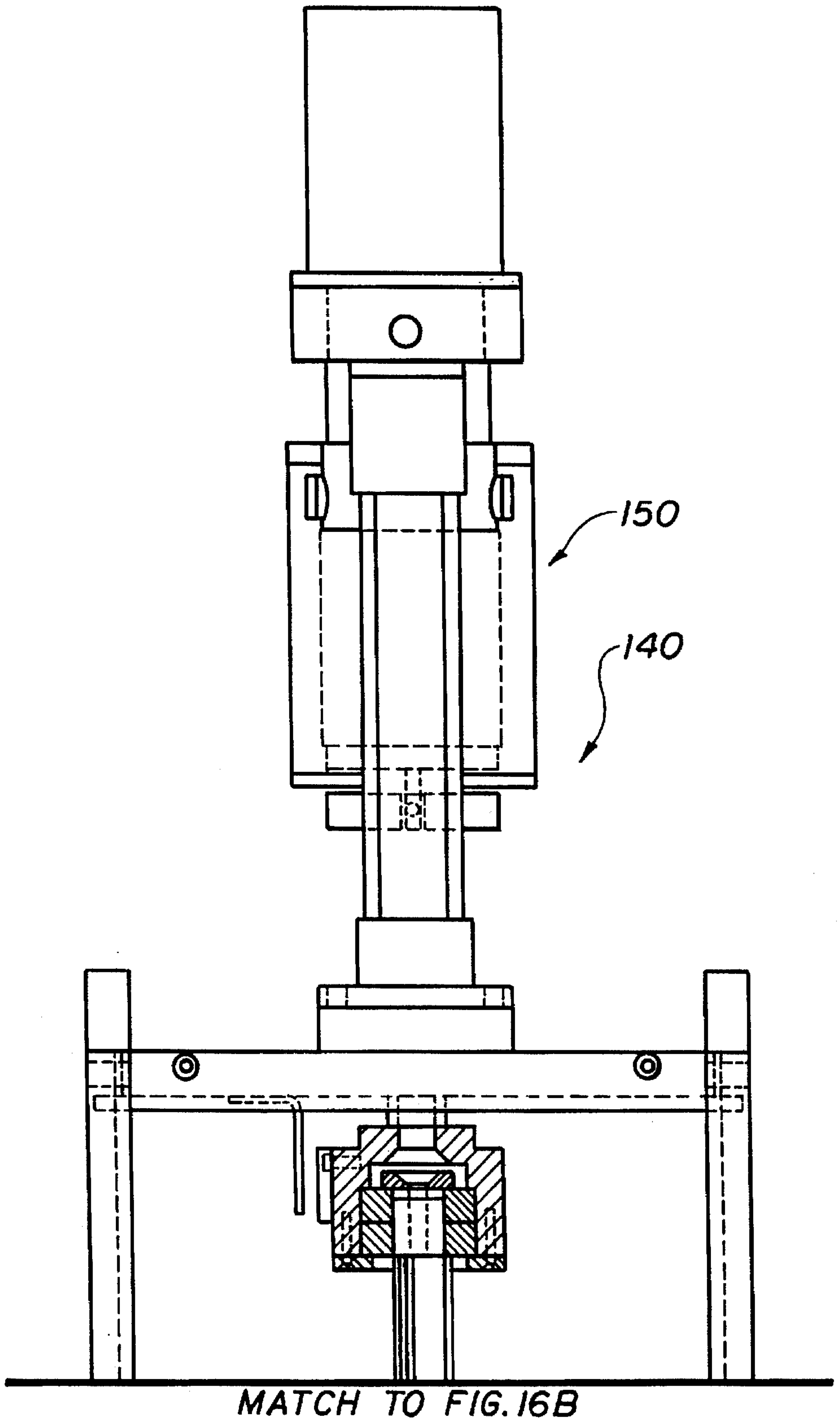
FIGS. 16A and 16B are schematic, cut-away, front views of the press assembly of the present system.
Figure 16B:
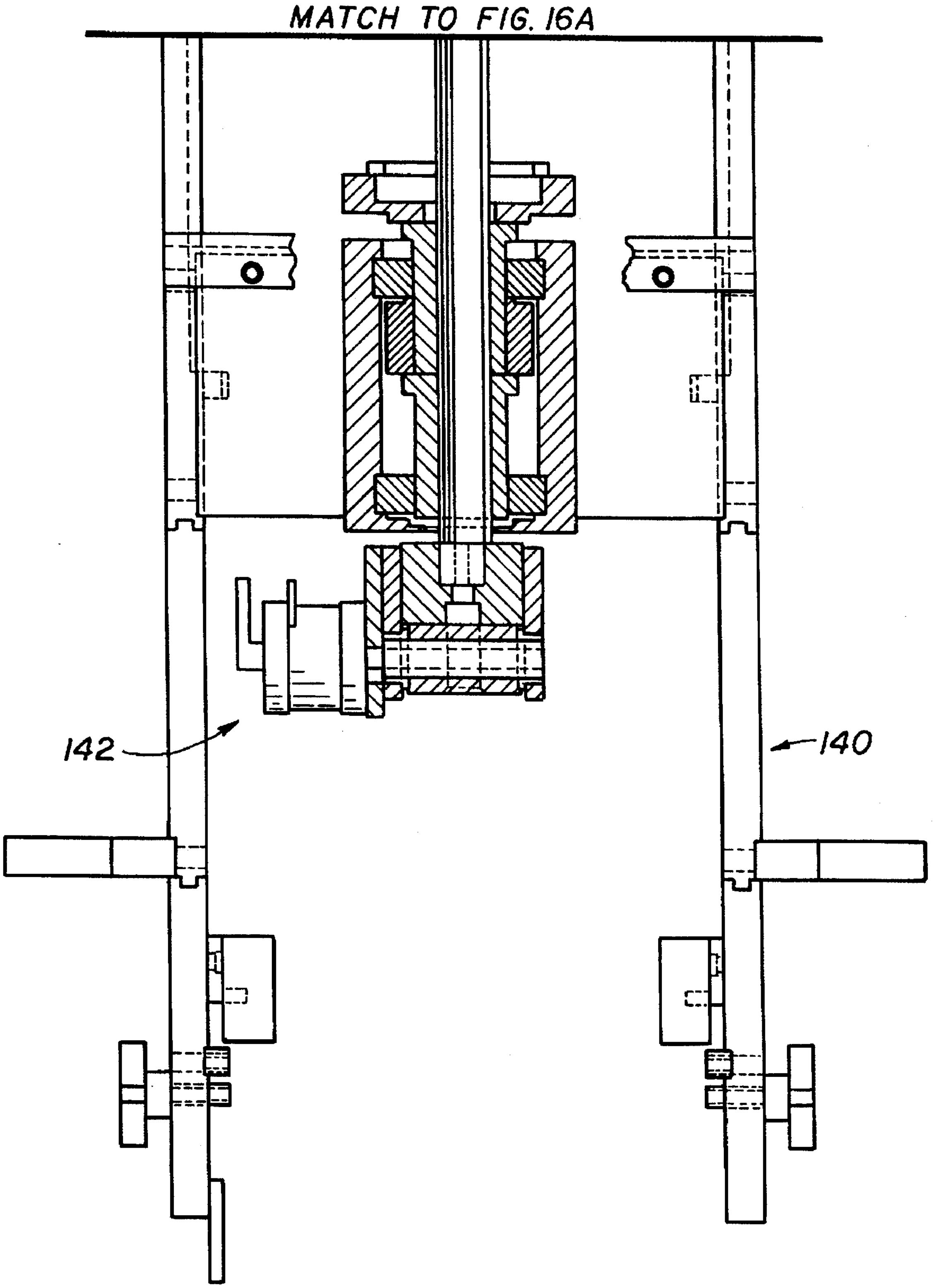

At station 6, FIG. 15F, a removing subassembly 102 is provided for orienting the bushing and transferring the bushing to the press arbor for insertion into the link SE. Most bushings B either have an identification lobe 112, shown in FIGS. 15G–15J, that must be aligned with the link SE when installed, or are eccentric with respect to the link, and must be installed in a predetermined radial position. This orientation is established by rotating the bushing B at the work station until the proper location is found, for example, when the identification lobe 112 is identified by an orientation subassembly 110.

Figure 11:
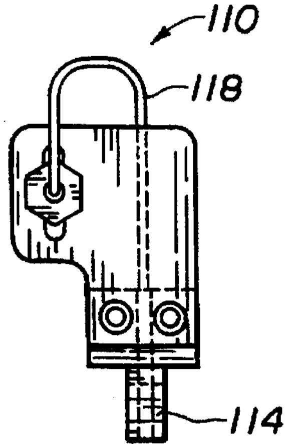
FIGS. 11 and 12 are side and front views, respectively, of a position sensor of the assembly station of the present system.
Figure 12:
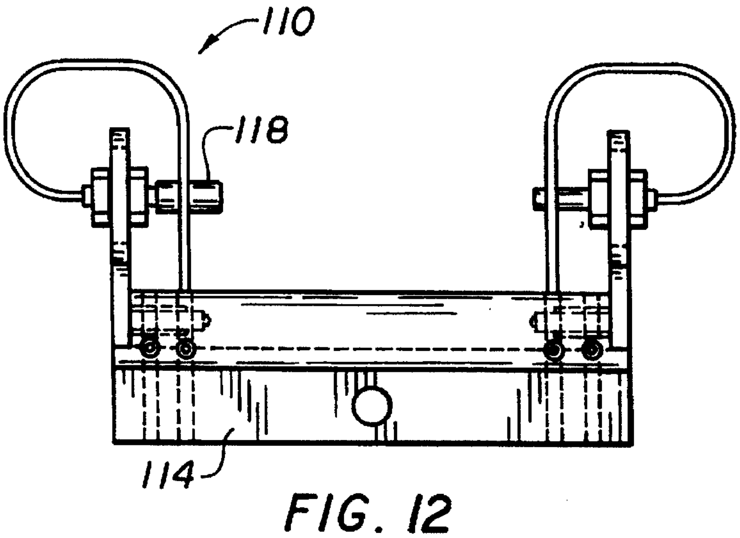
Figure 13:
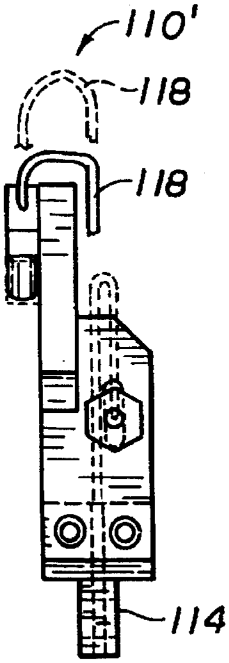
FIGS. 13 and 14 are side and front views, respectively, of an alternate embodiment of a position sensor of the assembly station of the present system.
Figure 14:
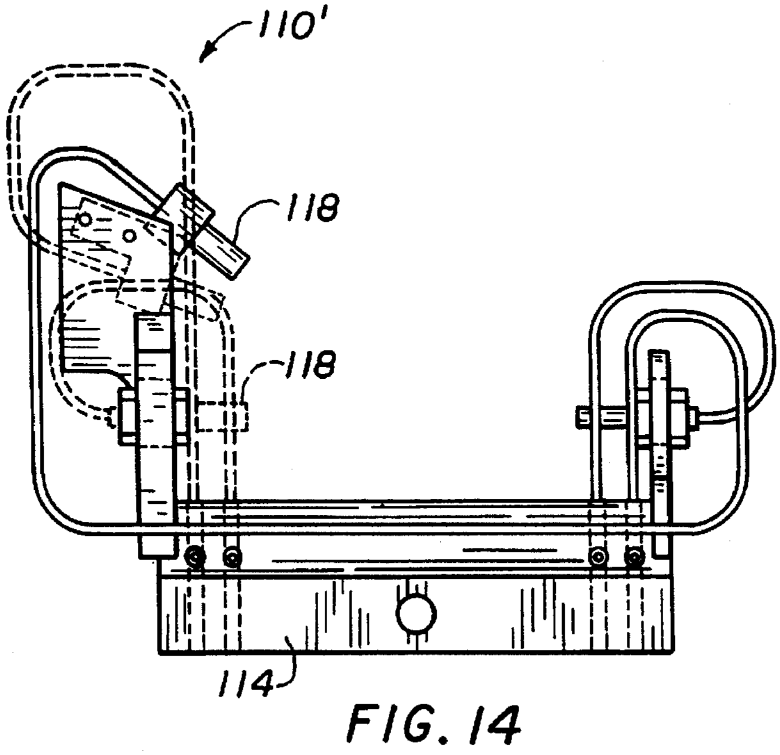

The illustrated orientation subassembly 110, in FIGS. 11–12, and in an alternate embodiment 110' in FIGS. 13–14, includes a quick change release base member 114, which is adapted for easy attachment to a support member 115 by a release pin. The orientation subassembly 110 is located adjacent the removing subassembly 102. Conventional fiber optic sensors 118 are positioned on the release member which are interconnected with the controller. Once the identification lobe 112 interrupts the fiber optic sensor, the controller is signalled that the bushing is properly aligned, and rotation of the bushing is stopped. It should be understood that a variety of fiber optic sensor arrangements, as shown in FIGS. 13 and 14, may be used to accommodate a variety of work piece configurations.

Each of the orientation and removing subassemblies 110, 102 are supported on a base member 117, which is driven both vertically and horizontally by the remover driver 119.

Once the bushing B is determined to be aligned by the orientation assembly, rotation of the bushing is stopped and locked in position for further operation. As illustrated Upon proper orientation, the removing assembly 102, which includes a stripping mechanism 104, is used to transfer the bushing B from station 6 to the press or press arbor assembly station 140. The steps involved in removal of the bushing, and transfer to the press station 140 are illustrated in FIGS. 15G–15L.

The press assembly station 140, includes an insertion subassembly 142, by which the bushing B is inserted into one of the link eyes SE. The press station 140 includes a conventional servo motor 150 powered by a ball screw with variable and programmable velocity, force, acceleration, deceleration and final position. The insertion subassembly and press assembly provide a 2-axis mechanism which accepts bushings horizontally, rotates them to a vertical position, and then vertically inserts the bushing into the link eye. The final insertion position for installation is preprogrammed to a position within 0.0025 accuracy for each individual part. The operator will be able to manually change this position by a predetermined tolerance amount to compensate for temperature, humidity, etc., based on daily variations.

Figure 9:
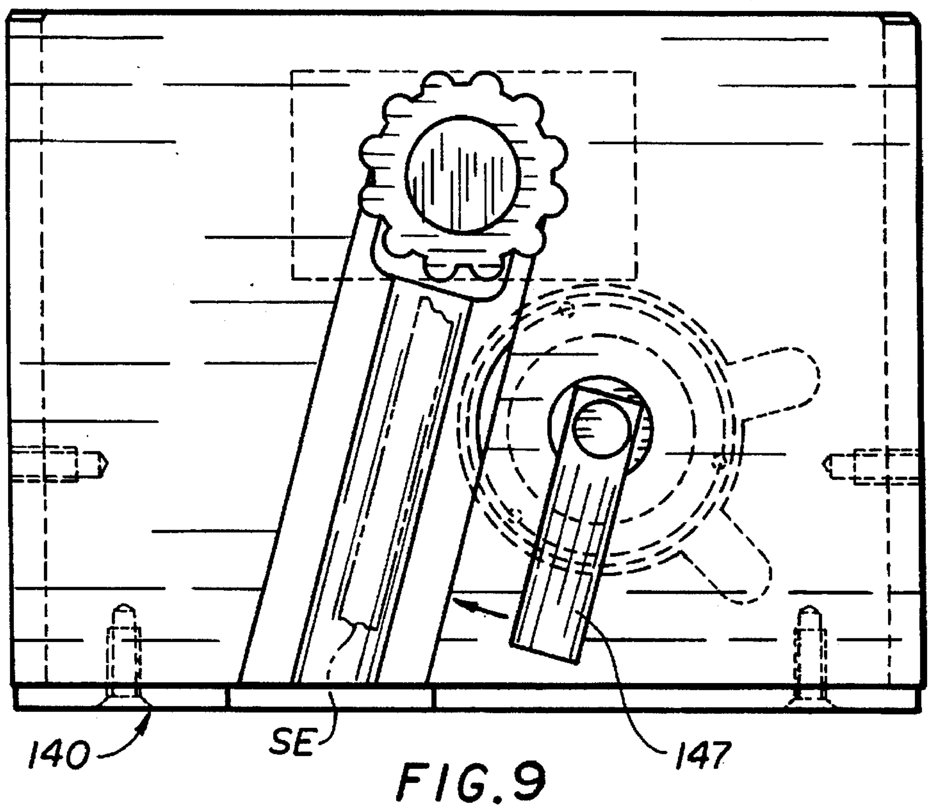
FIGS. 9 and 10 are press assembly stations for either the first or second work tables of the present system for holding the second work piece torsion bar for insertion of the first work piece bushing therein by the insertion subassembly.
Figure 10:
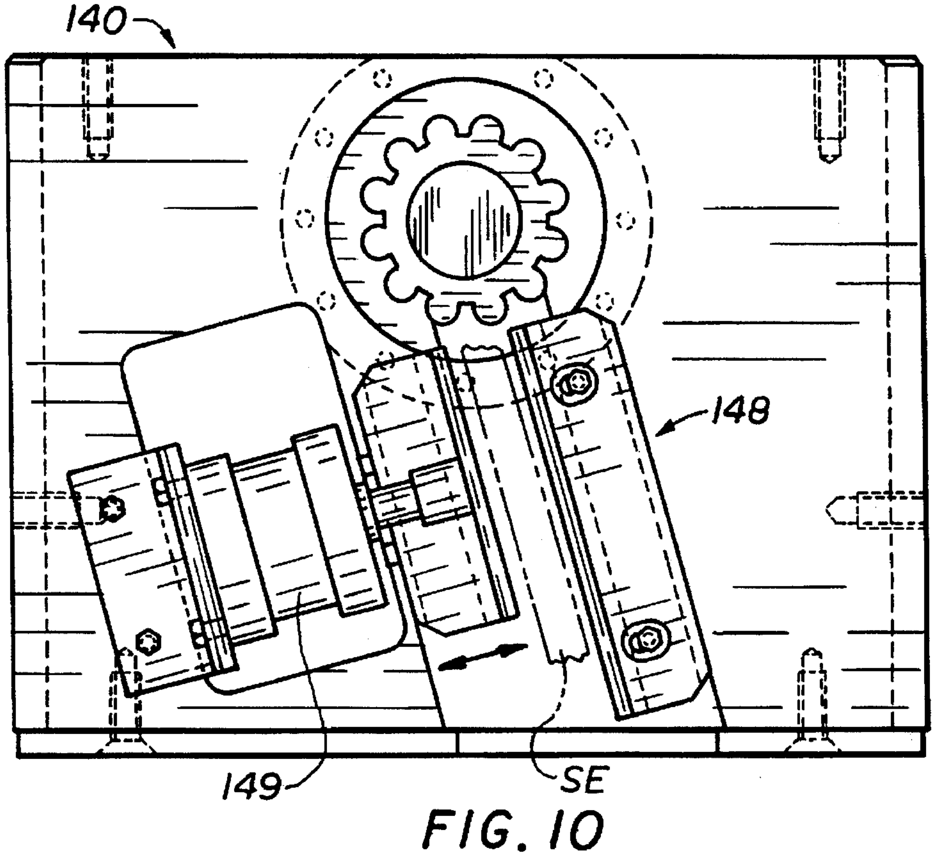

The base portions of alternate press assembly stations 140 are illustrated in FIGS. 9 and 10. Such base portions provide for maintaining the link or second work pieces SE during insertion of the bushing or first work piece B by the insertion subassembly 142. As shown in FIG. 9, a locking arm 147 is provided for securing the second work piece within the base portion. The base portion shown in FIG. 10 provides a vise-like assembly 148 which operates using a pneumatic cylinder 149 to secure the second work piece.

It should also be understood that the use of an induction heating device 146 may be used in connection with the press arbor or press assembly 140 for rapid curing of the adhesive or other materials applied to the surface of the bushing B by the coating assembly 79. Such induction heating devices have the advantage of rapid, controlled heating which cures the desired material, without impacting the structure or materials of the bushing or work piece.

The present invention also provides the additional advantage that the controller change over from different types of links can be accomplished in 5 minutes or less. As illustrated, the change over only requires removing various units out or unplugging the units and dropping or plugging in the next alternate unit. For example, the removable station subassembly 76 may be removed from a work station position by manually grasping the handle 75 and pulling the subassembly from the work table. All press motions and position variables are pre-programmed and may be automatically changed upon entering a part number on the operator panel of the control system 14.

The preferred forms of the automatic continuous manufacturing system have been described above. However, with the present disclosure in mind it is believed that obvious alterations to the preferred embodiment, to achieve comparable features and advantages in other assemblies, will become apparent to those of ordinary skill in the art.

We claim:

1. An automated continuous manufacturing system comprising, a rotatable work table having a plurality of work piece supports for maintaining work pieces during operation of said system, and a plurality of work stations for performing cleaning, pretreatment, treatment or assembly tasks on work pieces secured to said work piece supports, each task being performed at a respective work station, certain of said work stations comprising a removable station subassembly for performing a specific task, each of said removable station subassemblies is removably engagable with said rotatable work table and is replaceable with an alternate removable station subassembly for performing a desired alternate task, one of said work stations comprises an assembly station engaged with said rotatable work table for receiving work pieces from their individual work piece supports, and another of said work stations comprises a coating subassembly for providing coating material to each work piece, and including a removing subassembly for removing said work pieces from said work piece supports, and said assembly station further includes an orientation subassembly mounted adjacent said removing subassembly, for detecting the position of an alignment member of a work piece.

2. The system of claim 1, wherein said orientation subassembly is mounted adjacent said removing subassembly by a quick change release member to enable easy removal of said orientation subassembly and replacement with an alternate orientation subassembly.

3. The system of claim 2, wherein said position sensor of said orientation subassembly is a fiber optic sensor which detects the position of an alignment member of a work piece to ensure the proper alignment of said work piece prior to removal from said work piece supports.

4. The system of claim 2, wherein said removing subassembly further includes a stripping mechanism for removal of said work piece from said work piece support.

5. The system of claim 4 further comprising a press assembly, wherein following removal from said assembly station using said removing subassembly, said work pieces are provided to a press assembly for engagement within a second work piece.

6. The system of claim 5, wherein said work pieces are bushings for use in controlling vehicle vibration, and said second work piece is a torsion bar having first and second support rings, one at each end of said torsion bar, for receiving said bushings, and wherein said bushings are provided to said press assembly for said first support ring of said torsion bar from said rotatable work table, and said bushings are provided to a second press assembly for said second support ring of said torsion bar from a second rotatable work table.

7. The system of claim 6, wherein said press assembly and second press assembly each further include an insertion subassembly having a power cylinder for engagement of said work pieces with said second work piece by press fit engagement, and wherein an induction heating unit is provided for curing said coating material applied to said work pieces.

8. The system of claim 2, wherein said worktable is substantially enclosed to reduce the migration of coating material fumes from the system during operation.

9. The system of claim 2 wherein said coating subassembly work station comprises an application roller engagable with an external portion of said work pieces and a reservoir for supplying coating material to said application roller.

10. The system of claim 9 wherein said reservoir comprises a coating material tank housing coating material for engagement with said application roller.

11. The system of claim 9, wherein said coating subassembly work station coats said work pieces with a multiple component coating material.

12. The system of claim 11 wherein said reservoir comprises a dispensing assembly having a multiple component coating material housed in a plurality of removable containers, and dispensed from said containers by proper mixing ratios.

13. The system of claim 1, wherein a second rotatable removable work table is provided adjacent said rotatable work table having a plurality of work piece supports and a plurality of work stations for performing cleaning, pretreatment, treatment or assembly tasks on a work piece, each task being performed at a respective work station.

14. The system of claims 1 or 13 further including a controller comprising a preprogrammed computer for automatically controlling movement of the work pieces through the system and the application of coating material to the work pieces.

15. An automated continuous manufacturing system comprising, a rotatable work table having a plurality of work piece supports for maintaining work pieces during operation of said system, and a plurality of work stations for performing cleaning, pretreatment, treatment or assembly tasks on work pieces secured to said work piece supports, each task being performed at a respective work station;

certain of said work stations comprising a removable station subassembly for performing a specific task, each of said removable station subassemblies is removably engagable with said rotatable work table and is replaceable with an alternate removable station subassembly for performing a desired alternate task;

one of said work stations comprises an assembly station engaged with said rotatable work table for receiving work pieces from their individual work piece supports, and including a removing subassembly for removing said work pieces from said work piece supports for further assembly;

a controller comprising a preprogrammed computer for automatically controlling movement of the work table and the work pieces through the system, and applying a coating material to the work pieces; and a press assembly positioned adjacent said rotatable work table and following removal from said assembly station using said removing subassembly, said work pieces are provided to said press assembly for engagement within a second work piece.

16. The system of claim 15, wherein a second rotatable removable worktable is provided adjacent said rotatable worktable having a plurality of work piece supports and a plurality of work stations for performing cleaning, pretreatment, treatment or assembly tasks on a work piece, each task being performed at a respective work station.

17. An automated continuous manufacturing system comprising, first and second rotatable work tables each having a plurality of work piece supports for maintaining work pieces during operation of said system, and a plurality of work stations for performing cleaning, pretreatment, treatment or assembly tasks on work pieces secured to said work piece supports, each task being performed at a respective work station, certain of said work stations comprising a removable station subassembly for performing a specific task, each of said removable station subassemblies is removably engagable with said rotatable work table and is replaceable with an alternate removable station subassembly for performing a desired alternate task, one of said work stations comprises a coating subassembly for providing coating material to said work pieces, and a second of said work stations comprises an assembly station engaged with said rotatable work table for receiving work pieces from their individual work piece supports, and including a removing subassembly for removing said work pieces from said work piece supports for further assembly.

18. The system of claim 17, wherein said first and second work tables are supported on a base frame and include a work station section having said work stations and a drive mechanism section housing a driving mechanism for rotating said work tables, and said work station and drive mechanism sections are operatively interconnected and substantially enclosed to reduce the migration of coating material fumes from the system during operation.

19. The system of claim 18 further comprising a ventilation system interconnecting said base frame, work station section and drive mechanism section of said first and second work tables for exhausting coating material fumes during operation of said system.

* * * * *